Inventor
Allen M. Rossman

Feb. 20, 1934.   A. M. ROSSMAN   1,947,494
ELECTRIC RAILWAY SYSTEM
Filed May 25, 1929   7 Sheets-Sheet 2

Inventor
Allen M. Rossman
By Brown, Jackson, Boettcher & Dienner
Attys

Feb. 20, 1934.  A. M. ROSSMAN  1,947,494
ELECTRIC RAILWAY SYSTEM
Filed May 25, 1929  7 Sheets-Sheet 3

Inventor
Allen M. Rossman
By Brown, Jackson, Boettcher & Dienner
Attys

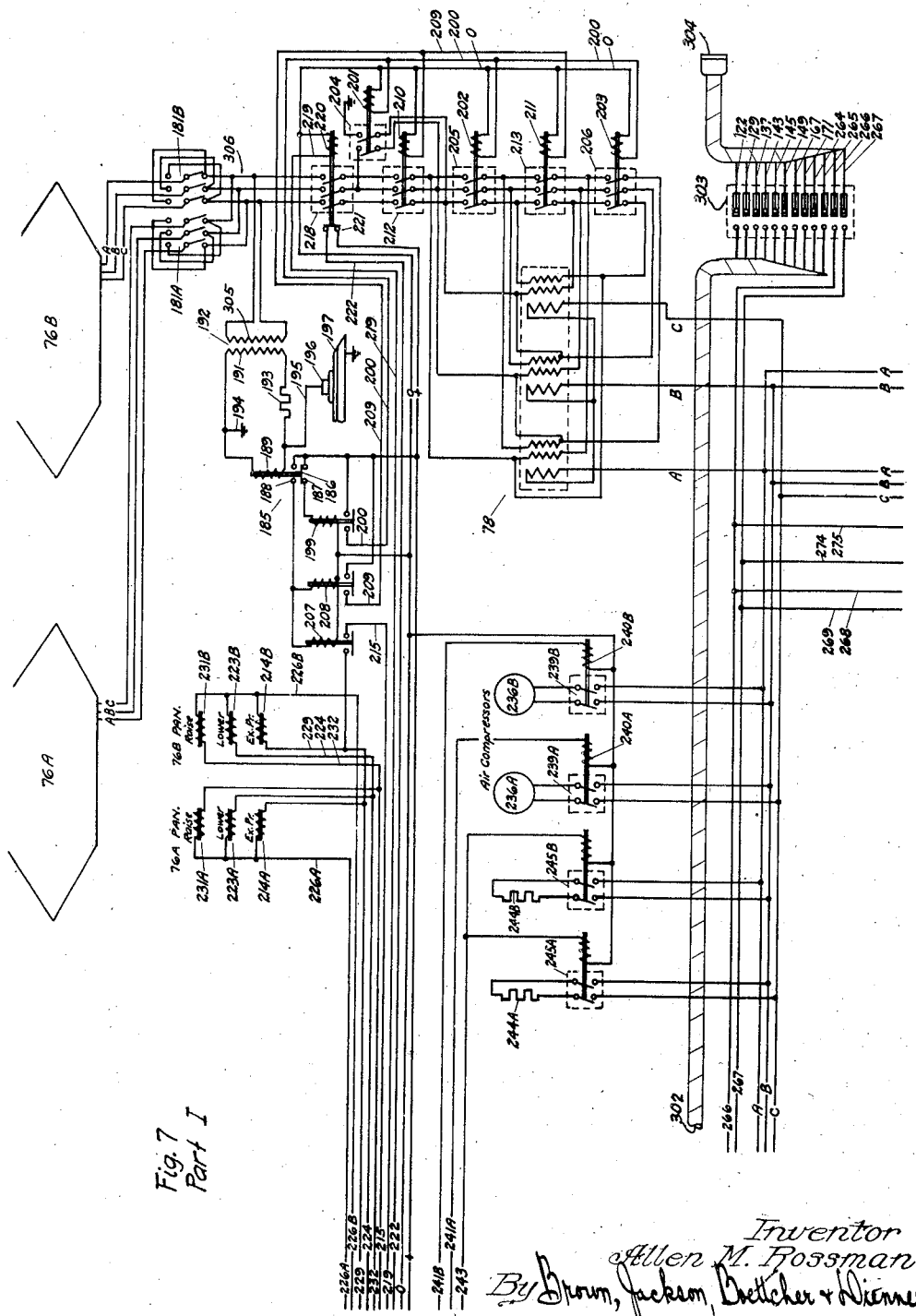

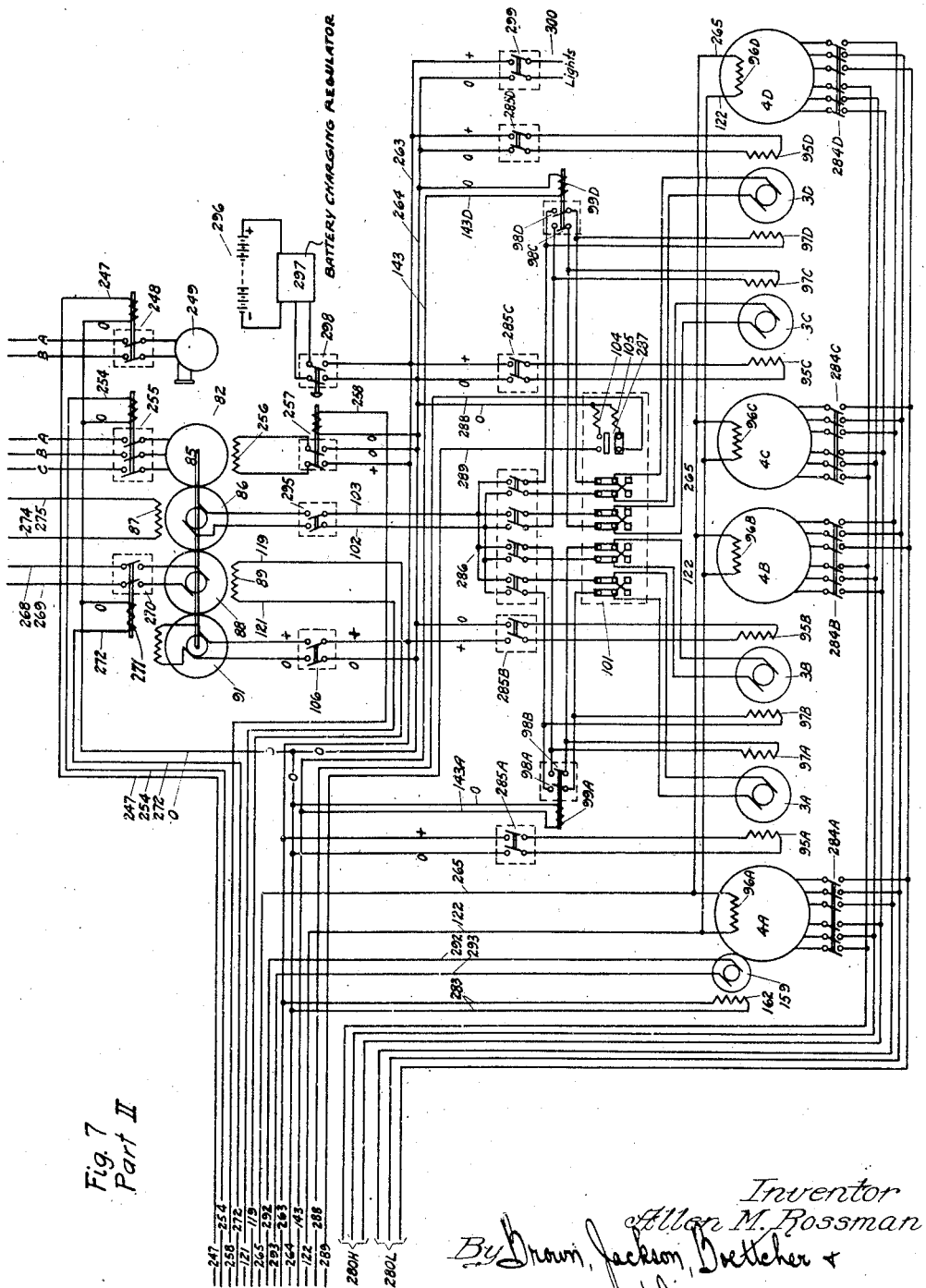

Feb. 20, 1934.  A. M. ROSSMAN  1,947,494

ELECTRIC RAILWAY SYSTEM

Filed May 25, 1929  7 Sheets-Sheet 6

Part III

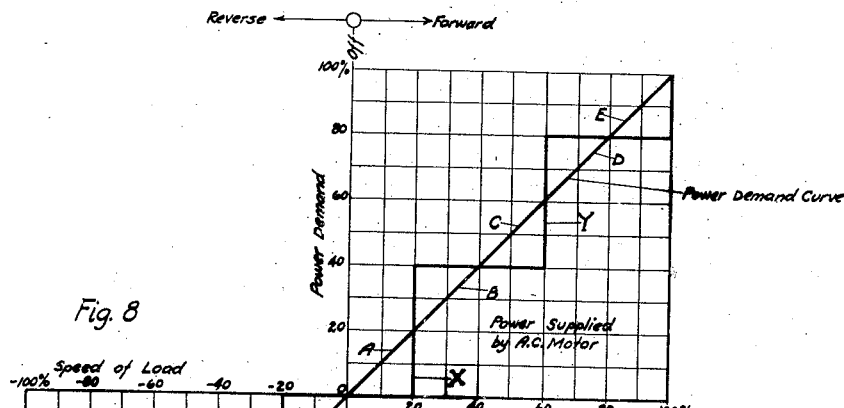
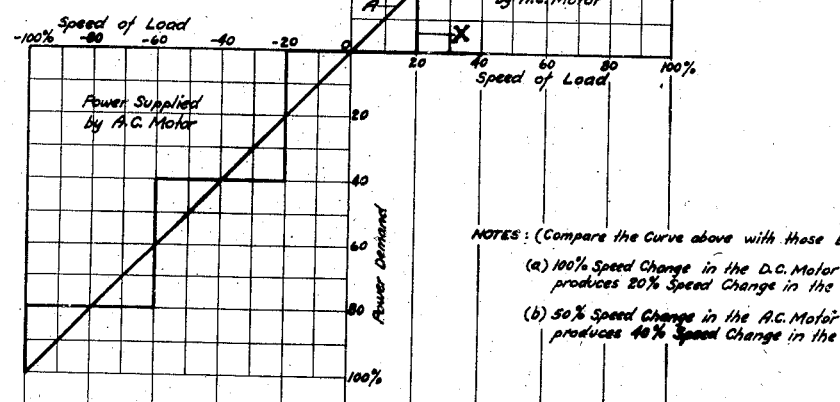
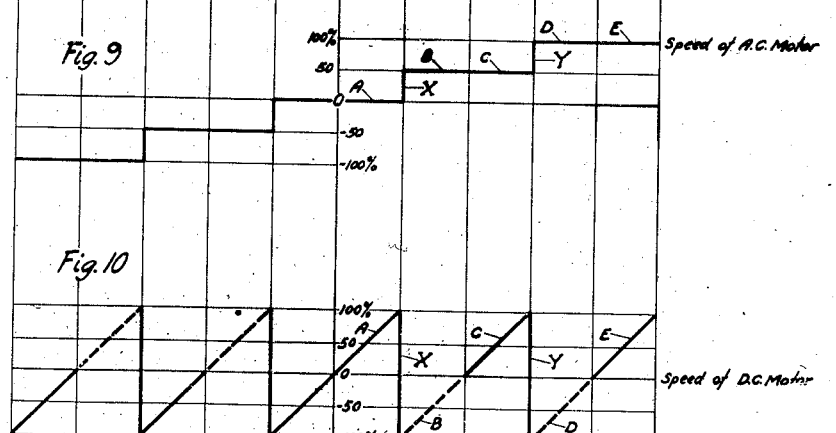

Patented Feb. 20, 1934

1,947,494

UNITED STATES PATENT OFFICE 1,947,494

ELECTRIC RAILWAY SYSTEM

Allen M. Rossman, Wilmette, Ill., assignor, by mesne assignments, to Rossman, Sargent & Lundy Patents Corporation, Chicago, Ill., a corporation of Illinois Application May 25, 1929. Serial No. 365,832

42 Claims. (Cl. 172—239)

My invention relates to electric railways and the like. More particularly the present invention provides operating means and control mechanism therefor suitable for driving an electric locomotive or the like with A. C. induction motors as the main power supply units. While the invention is described herein in connection with an electric locomotive, it is to be understood that the invention is not to be confined to any particular field.

The locomotive of my invention is a compact mechanism devoted to the collection of current from a trolley or other stationary conductor, or set of conductors, and the conversion of the power which is preferably three phase or single phase alternating current into driving effort available at the draw bar and under suitable control in respect to direction of drive, speed, power output and the like.

The locomotive is designed to operate on either three phase or single phase alternating current either exclusively, or the same locomotive may be operable interchangeably on three phase or single phase current.

In my United States Patents, No. 1,828,943, granted October 27, 1931, and No. 1,828,944, granted October 27, 1931, I have disclosed a variable speed drive taking energy from a three phase 60 cycle system and capable of operation through a wide speed range and power output.

In my United States Patent No. 1,828,948, granted October 27, 1931, I have shown the application of the drive in improved form to the operation of an electric locomotive. This patent is directed to the method of accelerating and decelerating a load, such as a locomotive, and the claims are directed broadly to such a method comprising balancing the torque of the two motors differentially, holding the speed of one motor at zero as the other motor initially accelerates the load, then reversing the other motor to bring the first motor up to synchronous speed, and further accelerating the load by driving it through the first motor.

The present application is directed more particularly to the controller for facilitating the successive operations of the elements of the drive, and the auxiliary mechanism of the driving elements as arranged in the locomotive for unit or multi-unit operation.

The system for the collection of current which, as above explained is preferably three phase alternating current of commercial frequency, preferably 60 cycles, is explained more particularly in my United States Patent No. 1,828,945, granted October 27, 1931. Suffice it to say here that current may be collected in any suitable manner either from a three phase overhead trolley having three conductors or two conductors and track return.

For single phase operation a single wire trolley with ground return or track return, or two conductor trolley may be employed. Obviously, instead of trolley wires conducting rails might be employed in any suitable position along the track.

As shown in my aforementioned Patent No. 1,828,945, where overhead trolley wires are employed either single or multiple a compensating device for maintaining the trolley shoes in alignment with the track is preferably employed.

In the application of the power to the load the fundamental principle involved is the application of torque to the axle by two differentially related motors. These motors and the axle are so interconnected that the three torques are always in equilibrium. The connecting means is preferably a differential gear of the planetary type but this is optional within the invention.

In the preferred form one motor is directly connected to the central pinion of the planetary gear and the second motor is connected to the ring or orbit gear, the axle being connected to the cage containing the planet gears or pinions. With this arrangement the axle may be driven by either motor acting alone or by both motors acting together.

When both motors are running the speed of either one may be varied independently of the other and the speed change is reflected in a corresponding change in the speed of the axle. This characteristic is utilized by making one of the motors constant speed and the other variable speed.

In the preferred form herein shown a constant speed squirrel cage type induction motor capable of giving two speeds, such as 600 and 1200 revolutions per minute, is direct connected to the sun pinion. The variable speed direct current motor is geared to the orbit gear. Preferably, and by way of example, the gear ratios are so chosen that 720 revolutions per minute of the D. C. motor are equivalent to 300 revolutions per minute of the A. C. motor.

With the A. C. motor running at 1200 R. P. M. and the D. C. motor at 720 R. P. M. the locomotive will be running at its maximum speed, which will be designated at 100%. As 720 R. P. M. of the D. C. motor are equivalent to 300 R. P. M. of the A. C. motor, if the D. C. motor be brought to rest, the axle speed will be reduced to 80%. If the D. C. motor be run at 720 R. P. M. in the reverse direction, the axle speed will be further reduced to 60%. Likewise with the A. C. motor running at 600 R. P. M. and the D. C. motor at rest the axle speed will be 40%. The axle speed may then be varied by the D. C. motor plus or minus 20% or between the limits of 60% and 20%.

With the A. C. motor at rest, the D. C. motor operating alone may vary the axle speed between the limits of 20% and zero. In this manner the axle speed may be made to cover its complete range from 100% to zero.

The maximum power requirement is at maximum speed. At this speed both motors are operating against the same axle torque. The horsepower delivered by each is, therefore, directly proportional to the speed at which each, acting alone, would drive the axle against this torque. These values are; for the A. C. motor 80%, for the D. C. motor 20%. That is, the rating of the D. C. motor is but ⅕ of the maximum power requirement of the axle.

Speed control of the D. C. motor is accomplished by varying the voltage impressed on its armature terminals. This variable voltage is supplied by a motor generator set.

While the D. C. motor is adding speed to the axle it draws energy from the motor generator set. While the A. C. motor is operating at a speed higher than that required by the axle, the horse-power equivalent of this excess speed is utilized to drive the D. C. motor as a generator, and it then delivers energy to the motor generator set.

The D. C. motor is changed from a motor to a generator by bringing the voltage impressed on its armature terminals down to zero, and then building it up in the opposite direction. This also changes the direction of rotation of the D. C. machine. The direction of current flow through its armature does not change with the change in direction of rotation, except as the direction of drive of the entire locomotive is reversed.

For the same horse-power requirement the motors and, with the exception of the gear on the axle and the driving gear that meshes with it, the gears are interchangeable on freight and passenger locomotives. The axle gear ratio may be varied to suit the different speed requirements.

The A. C. motors are constant speed squirrel cage type, the simplest type of A. C. motor. The elimination of commutator and collector rings removes a limitation to the adoption of high motor speeds. The high speed motor delivers more horse-power than a slower speed motor of the same dimensions and weight, and it also has a higher ratio of pullout torque to running torque.

Each A. C. motor is designed to give two speeds, such as 600/1200. These two speeds are obtained by different coil groupings of a single primary winding.

Each A. C. motor is provided with a brake to hold it at standstill while the D. C. motors start the locomotive and carry it over the first step of its speed cycle. There is no rubbing action between the motor and the brake, as the brake is applied only when the A. C. motor is at rest.

The A. C. motors operate at speeds that make them self-ventilating and so do not require forced ventilation from external blowers.

A transformer carried by the locomotive steps down the trolley voltage to a value best suited to the motor design.

The D. C. motors are compound wound, their shunt windings being separately excited. Unaided by the A. C. motors they start the locomotive and carry it over the first step of the speed cycle. From then until the locomotive reaches its maximum speed, they cover their cycle from maximum in one direction, through zero, to maximum in the opposite direction, twice. They thus cover their speed range between zero and maximum five times while the locomotive covers its speed range once. These figures do not include the periods when they idle the A. C. motors from one speed to another which will be discussed in a later paragraph.

Because they will at times carry large currents while at standstill or while operating at low speeds, the D. C. motors must be forced ventilated.

The A. C. motor on the motor generator set may be of either the induction or synchronous type. If synchronous, it would be made oversize so that it may be operated with a leading current to keep the power factor of the energy drawn by the locomotive high.

The rating of the D. C. generator is equivalent to the sum of the ratings of the D. C. motors that it controls. For a four-axle drive locomotive, the rating of the motor generator set would be equivalent to that of one of the A. C. motors.

Two direct connected exciters are provided. One operates at constant voltage. It furnishes energy for exciting the shunt field coils of the D. C. motors, and for control purposes. The second exciter operates at variable voltage by means of field control. It furnishes energy for exciting the fields of the D. C. generator of the motor generator set. If used in multiple unit control operation, this exciter should be of sufficient capacity to furnish the excitation for as many motor generator sets as there are units to be controlled.

A small storage battery floats on the busses of the constant potential exciter. It provides energy for operating the control circuits when the trolley wires are dead or when the pantographs are down. When required it can furnish energy to start the motor generator set.

The gear ratios throughout are of unusually low values. Low gear ratios give small angles of approach, which in turn tend to decrease the noise and increase the life of the teeth. Low gear ratios are particularly desirable on regeneration where the smaller gear is driven by the larger one.

The planetary gears embody novel features. First, the pins on which the planet gears are mounted are supported at both ends. This design eliminates the unbalanced forces that are incidental to the usual cantilever method of supporting the idlers. Second, discs outside of the gear teeth on the pitch diameter circles provide bearing surfaces on which the gear bodies roll while their teeth are in contact.

The ring gear and the planet gears are thus held in perfect alignment with the central pinion without resort to the more usual types of bearings, and the friction is kept to a minimum.

Starting and speed control are accomplished in the following manner:

First, the motor generator set is started. From then on it runs continuously while the locomotive is in service.

The shunt fields of the D. C. motors are excited.

The brakes are applied to the A. C. traction motors to keep them from revolving during the initial step of the speed cycle.

The field of the D. C. generator is then built up until the D. C. motors start the locomotive. The excitation is then gradually increased to its maximum value. Finally the series field windings are short circuited. These operations bring the locomotive up to 20% of its maximum speed.

With the locomotive running at 20% speed, the brakes on the A. C. motor are released. The excitation of the D. C. generator is then decreased to zero, then increased to maximum in the opposite direction. This causes the D. C. motors to change their speed from maximum in one direction, through zero, to maximum in the opposite direction and in so doing they idle the A. C. motors from zero speed up to their low speed rating (600 R. P. M.). The A. C. circuit breaker then closes on the 600 R. P. M. windings.

Next, the excitation of the D. C. generator is gradually decreased to zero, then increased to maximum in the opposite direction. This causes the D. C. motors to bring the locomotive from 20% up to 60% speed. At this point, the circuit breaker of the A. C. motor opens. The excitation of the D. C. generator is then decreased to zero, then increased to maximum in the opposite direction, thereby causing the D. C. motors to idle the A. C. motors from 600 up to 1200 R. P. M. when the A. C. circuit breaker closes on the 1200 R. P. M. windings. From this point of the cycle to 100% speed the operation is similar to the step from 20% to 60%.

The axles are brought up to speed in the reverse direction by reversing the proper motor leads then carrying through the same control cycle.

All of the speed control and switching connections of the cycle just described are made by a controller.

The controller consists of two separate units which are interconnected by gears. One unit controls the direction of rotation and the speed of the D. C. motors; the second unit controls the braking and the switching of the A. C. motors. The switch for reverse operation is also mounted on and suitably interlocked with the controller.

The D. C. controller is loosely connected to its shaft to permit a small amount of backlash. The controller handle is mounted on this shaft. The movement of the handle over 180° of travel causes the D. C. motors to cover their complete speed range from maximum in one direction, through zero, to maximum in the opposite direction.

The A. C. controller is geared to the shaft of the D. C. controller through a gear reduction of approximately 3 to 1. The controller handle moves through a total range of 810°.

The functioning of the controllers corresponding to the various movements of the controller handle are shown by the following table:

| Turns of controller handle | | Change in speed of D. C. motors | | Function of A. C. controller |
|---|---|---|---|---|
| From | To | From | To | |
| | | Percent | Percent | |
| 0 | .25 | 0 | +100 | Holds brakes on A. C. motors. |
| .25 | .75 | +100 | −100 | Idles A. C. motors to 600 R. P. M. Connects with slow speed synchronizing generator (see next paragraph). |
| .75 | 1.25 | −100 | +100 | Holds A. C. motors at 600 R. P. M. |
| 1.25 | 1.75 | +100 | −100 | Idles A. C. motors to 1200 R. P. M. Connects with high speed synchronizing generator. |
| 1.75 | 2.25 | −100 | +100 | Holds A. C. motors at 1200 R. P. M. |

Synchronizing of the A. C. motors with the power system is accomplished by matching two D. C. voltages on a relay. When the voltages are equal and in the same direction, the relay functions to close the motor circuits. One D. C. voltage is obtained from a small synchronizing motor generator set connected to the source of power. Two such sets are provided, one running at double the speed of the other. Each set corresponds to one of the two speeds of the A. C. traction motors. The other voltage is obtained from a small D. C. generator driven by one of the A. C. traction motors. The synchronizing generators have similar voltage characteristics, and are excited from a common source. When their voltages are equal and in the same direction they indicate that the traction motor is running at the speed corresponding to the frequency of the power system and with the correct phase rotation. If the voltages were equal but reversed in direction, it would indicate a reversal of phase rotation of the A. C. traction motors.

Lost motion is provided between the D. C. controller and the A. C. controller to compensate for a possible slowing down of the locomotive during the time the A. C. motors are being idled. It insures that the A. C. motors are running at speeds higher than normal when the A. C. controller closes its switching contacts. They are then idled to a lower speed by the D. C. motors and when their speed is correct are closed on the power circuit by the synchronizing relay. In starting the locomotive, the lost motion permits the A. C. motor brake to be applied before the D. C. motor is energized.

The D. C. controller is designed to operate the D. C. motors at a speed higher than that corresponding to synchronism of the A. C. motors. That is to say, the D. C. controller when in fully on position forward or backward is designed to drive the D. C. motors at say plus or minus 120% of speed when plus or minus 100% would correspond to plus or minus 20% of maximum locomotive speed with the D. C. motors alone driving the locomotive.

When in starting the locomotive forward the controller has passed the +100% D. C. speed point the A. C. motor brake is released at this position, the notched part of the D. C. controller is passed and the controller handle is rapidly moved until the notched part of the D. C. controller is again brought against the click or ratchet roller. In this motion, which is slightly more than 180° of the D. C. controller, the D. C. motor has been slowed down, stopped, reversed and accelerated to maximum (−120%) reverse speed before the control circuit for the A. C. motor is closed subject, however, to remaining open due to the control of the synchronizing control relay which will not let the A. C. motor circuit close until the controller handle has been further moved to cause the D. C. controller to pass on the other side of maximum position, i. e., between −120% and −100% speed of the D. C. motors whereupon the A. C. motor circuit is closed.

Further motion of the control handle causes the D. C. controller to decelerate, then stop and accelerate in the forward direction to full speed (+100%) whereupon the A. C. motor circuit is opened. But further motion of the controller handle moves the D. C. controller to maximum speed position, i. e., driving the D. C. motors at +120% speed.

Then after slightly more than 180° travel of the handle the A. C. controller makes the contact which selects the new speed connections. This is at the time when the D. C. motors are running at their maximum speed and this corresponds to a speed of the A. C. motors somewhat higher than their synchronous speed. As the controller handle is moved further the D. C. motor begins to slow down, bringing the A. C. motor down to synchronous speed at which point the voltage on the small generator which is driven by the A. C. motor equals the voltage of the small generator of the synchronizing set. This voltage balance closes the synchronizing relay and completes the closing circuits which connect the A. C. motors to the line on the new speed connections.

The reason for dropping out the A. C. motors before the D. C. motors reach their maximum speed is to conserve a margin of speed in the D. C. motors to make up for a possible slowing down of the locomotive during the idling period. In order to keep the same relation between the A. C. and D. C. controllers during regeneration when the handle is being turned in the opposite direction, a small amount of backlash is provided on the D. C. controller. This permits it to trail behind the A. C. controller in either direction of rotation.

All operations are so interlocked that it is impossible for the operator to make any connections but those which give a correct and smooth control throughout the entire cycle. If with the A. C. motors disconnected there should be an appreciable change in the speed of the locomotive, the direction and extent of the departure is indicated by an instrument which shows the respective values of the two synchronizing voltages. This also shows the direction and amount of movement of the controller handle required to bring the traction motors into synchronism with the system.

In case of emergency, one or more motors may be disconnected, when the locomotive will operate with a proportional reduction in power. Unlike the D. C. series multiple system, any motor may be taken out of service without upsetting the balance of the speed control system.

The field circuit of the D. C. generator of the motor generator set, and the circuits which control the brakes and the speed connections of the A. C. motors are connected to the train line circuits of each unit. When the train line circuits of the several units are interconnected, any unit may be used as a center from which to control all the units.

An inherent characteristic of a locomotive operating on this system is its tendency to hold a constant speed on each controller setting.

In going downgrade the locomotive automatically starts to regenerate in order to hold this speed. To decelerate under regenerative control the operator merely backs off the controller and watches the instruments to see that the motors are not unduly overloaded. No additional accessories are required to make the equipment suitable for regenerative control between the speed limits of 100% and 20%; that is, while the D. C. motors are operating as shunt wound machines.

The elimination of rheostatic control on acceleration and the substitution to a large extent of regenerative braking for friction braking tend to make substantial savings in power consumption.

An A. C. motor having a speed ratio of 1 to 2 was selected because both speeds can be obtained from a single motor winding. It has been shown that the rating of the corresponding D. C. motor then becomes 1/5 of the total. If an A. C. motor giving speeds of 1/2/3 were used, then the D. C. motor rating would become 1/7 of the total. Such an A. C. motor would require two separate windings, one of which would be designed to give two speeds. The saving in D. C. equipment is not enough to compensate for the additional cost and complications of the three-speed A. C. motors and their control equipment.

Now in order to acquaint those skilled in the art with the manner of constructing and operating a device embodying my invention, I shall describe in connection with the accompanying drawings a locomotive embodying the same.

Figure 7:
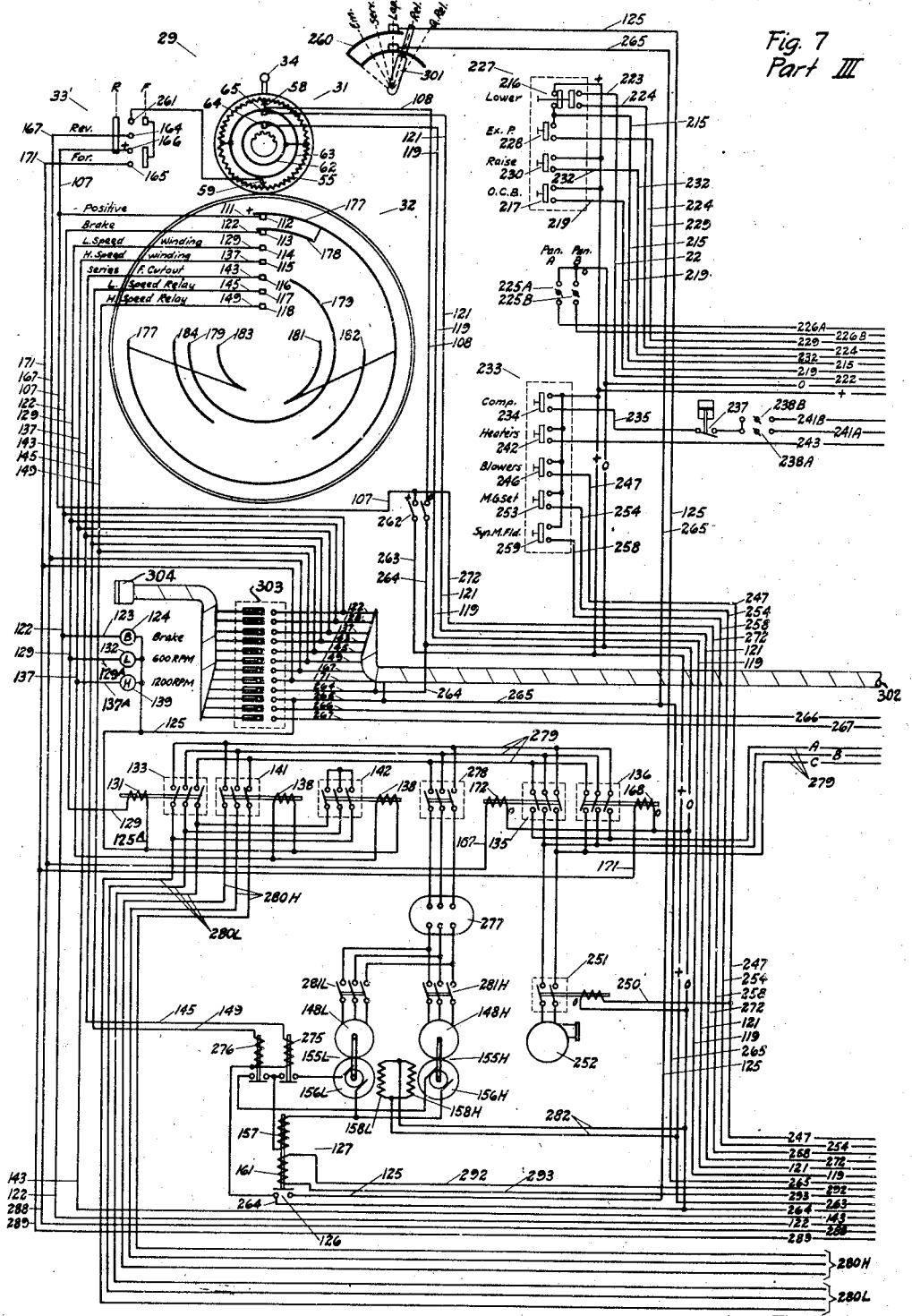

Figure 7, which is extended over three sheets and consists of Parts I, II and III is a diagram of the connections of the locomotive. Part II is placed below Part I and Part III is placed to the left of Parts I and II; and Figures 8, 9, 10 are diagrams to explain the operations of the traction motors throughout the range of operation of the locomotive.

Figure 4:
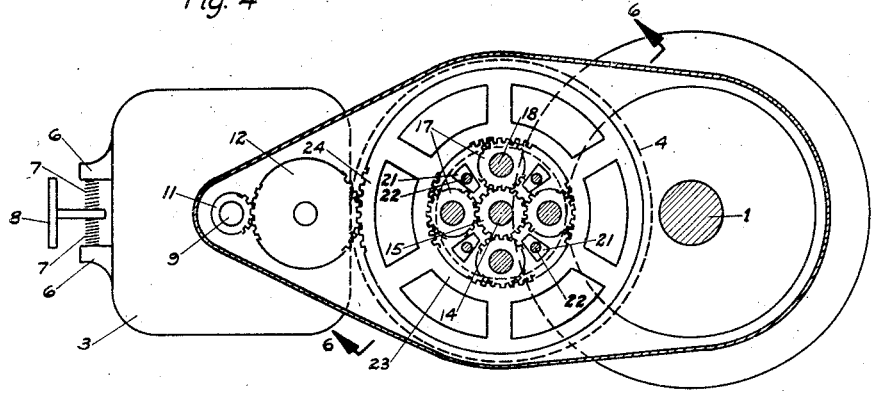
Figure 4 is a vertical section on the line 4—4 of Figure 5 through the gears and driving axle.
Figure 6:
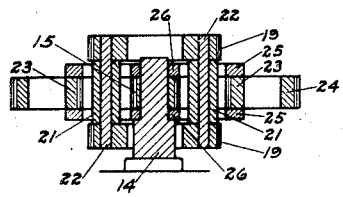
Figure 6 is a fragmentary detail view taken on the line 6—6 of Figure 4.
Figure 5:
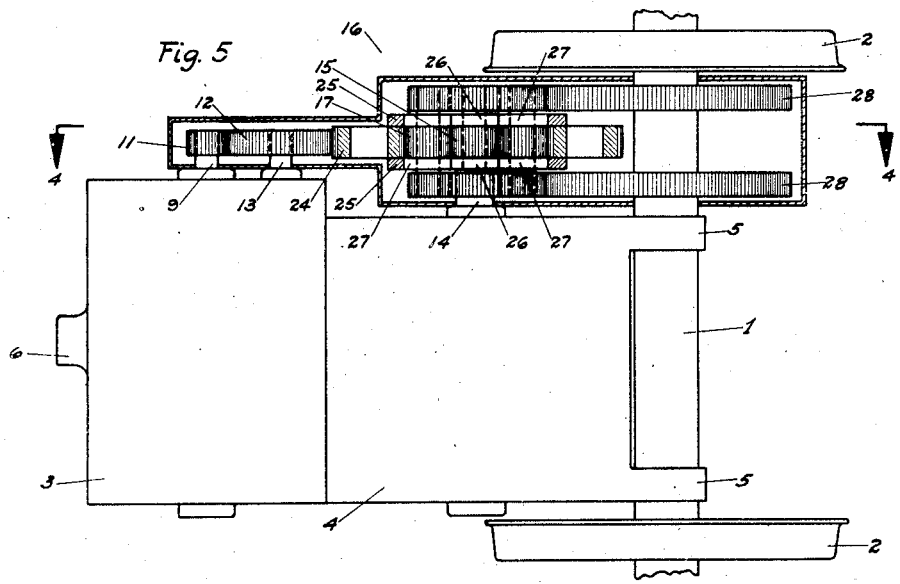
Figure 5 is a top plan view with a part of the gear case and the gears cut away on a horizontal plane of the driving axle and connected motors.

Referring, first, to Figures 4, 5 and 6, the locomotive embodies one or more driving axles 1 having driving wheels 2 running on the track rails, not shown. The axle 1 is mounted in suitable boxes supported in a truck frame which for the sake of clearness has been omitted. The driving axle 1 is driven by a direct current motor 3 and a main alternating current motor 4.

The motor 3 is preferably compound wound, that is, it has both a series field and a shunt field, as will more fully appear later, and the main motor 4 is a squirrel cage motor provided with a brake for holding the same stationary against the torque of the direct current motor 3 and having its winding arranged with taps for operating the motor at two fixed speeds, as for example 600 revolutions per minute and at 1200 revolutions per minute. The main motor 4 has ears or straps 5—5 embracing the axle 1 by which said motor is supported in part upon the axle 1. The direct current motor 3 has its frame secured to the frame of the motor 4 and the direct current motor has a suspension nose 6—6 by which the torque reaction of the motors with respect to the axle 1 is taken up, as through the cushioning springs 7—7 upon opposite sides of a frame member 8 forming a part of the truck frame. The direct current motor 3 has a shaft 9 upon which is mounted a pinion 11. This pinion meshes with an idler 12 which is mounted upon a stationary stud 13 secured upon the frame of the direct current motor 3. The alternating current motor 4 has a shaft 14 which bears the central or sun pinion 15 forming part of the differential gear 16. A plurality of orbit gears or idlers 17 are mounted upon pins 18, these pins 18 at their opposite ends being disposed in gears 19—19. The gears 19—19 are secured together by posts and bolts 21 and 22, as shown in Figure 4, to form a cage for mounting the said planet gears 17.

An internal gear member 23 which forms an orbit gear for the planet gears 17 embraces said cage and meshes with the orbit gears 17. An external spur gear 24 is rigidly connected to said orbit gear 23 and the said external spur gear 24 meshes with the idler 12 driven by the direct current motor pinion 11. It can be seen, therefore, that the direct current motor pinion 11 drives the orbit gear through a suitable gear reduction.

The orbit gear 23 has rings 25—25 secured upon opposite sides thereof, these rings 25 being bearing rings having their inner cylindrical surface lying on the pitch circle of said orbit gear 23.

Likewise, the central or sun pinion 15 which is mounted on the motor shaft 14 is provided with cylindrical bearing members 26—26 having cylindrical exterior surfaces of the same diameter as the pitch circle of said pinion 15.

The orbit gears 17—17 likewise have cylindrical roller surfaces 27—27 lying on the pitch circles of said orbit gears. By thus disposing the rolling surfaces tangent to each other and lying on the pitch circles of the respective gears an adequate bearing for these gears with respect to each other is obtained.

The gears 19—19 which form a part of the cage in turn mesh with gears 28—28 keyed upon the driving axle 1.

While this illustrates one specific manner of connecting the axle 1 in differential relation with the main motor 4 and the variable speed motor 3, there are other possible differential connections within my invention, the above being illustrated by way of a suitable example.

Figure 1:
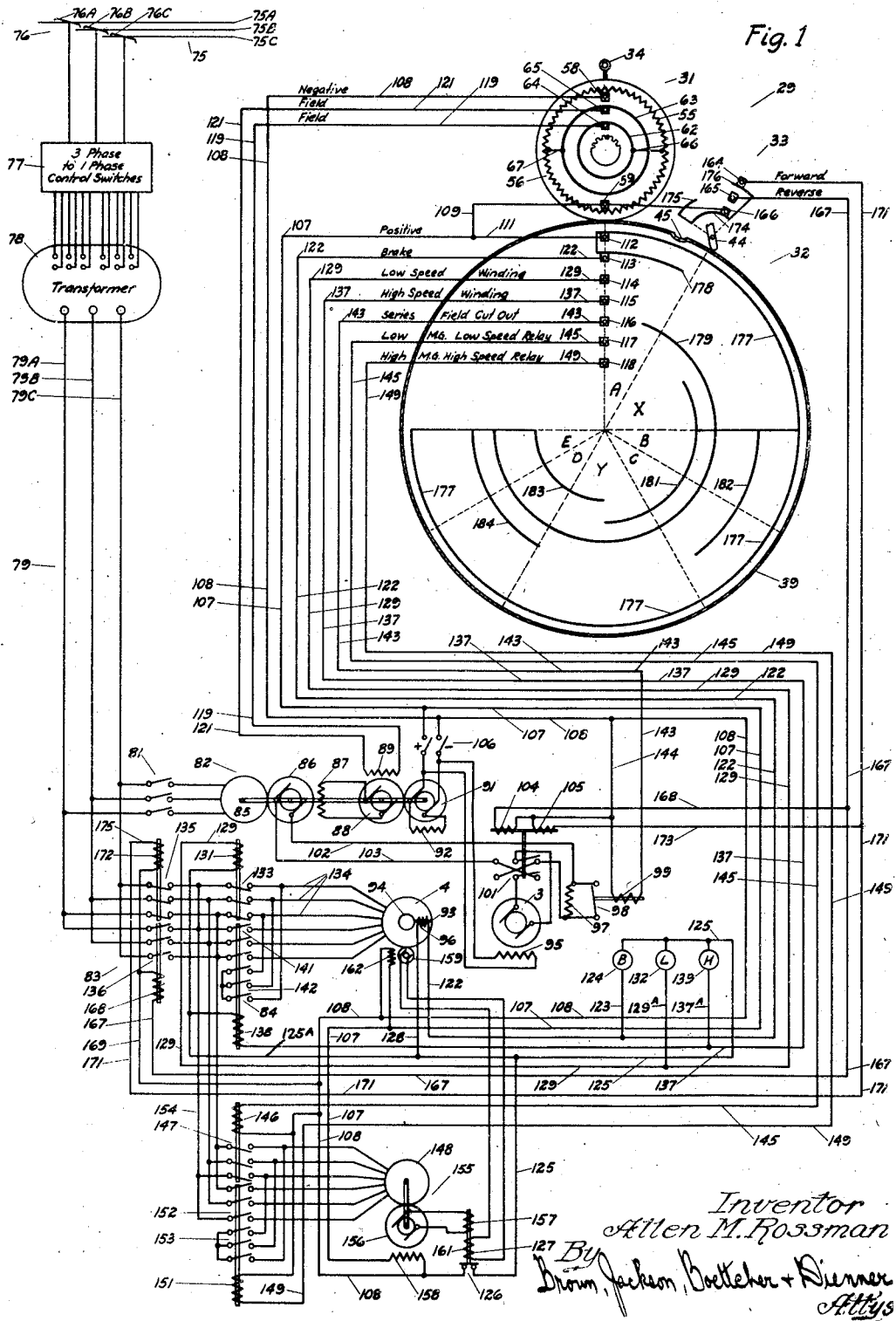
Figure 1 is a simplified diagram of the electrical connections to the motor system and the controller therefor of a locomotive constructed in accordance with my invention.
Figure 2:
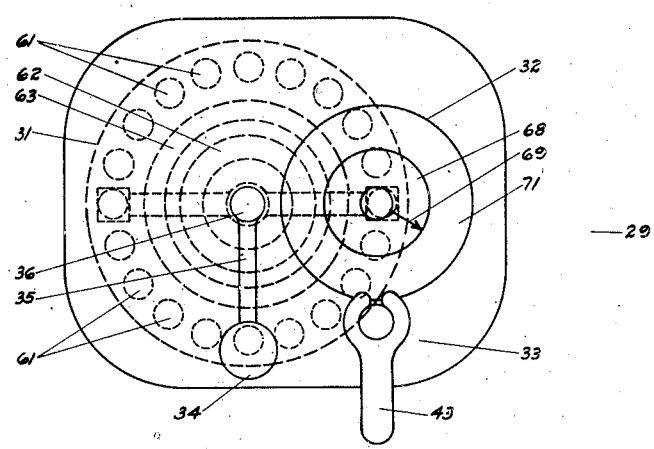
Figure 2 is a top plan view of the controller.
Figure 3:
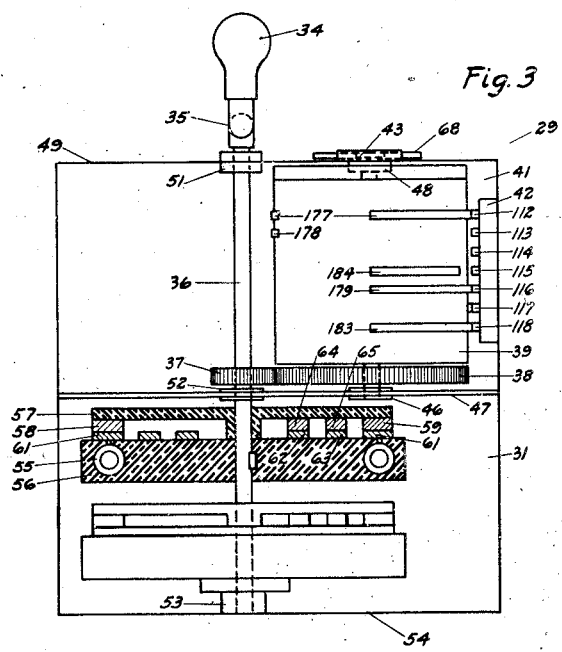
Figure 3 is a side elevational view, the view being largely diagrammatic.

Referring now to Figures 1, 2 and 3, the controller 29 comprises three units, namely, the direct current control unit 31, the alternating current control unit 32, and the reversing switch 33. A common operating handle 34 for operating the units 31 and 32 is provided, this handle being mounted upon a crank arm 35 connected to a shaft 36. The shaft 36 bears a pinion 37 which meshes with a gear 38, this gear being connected through a small degree of lost motion to the drum 39 which drum bears suitable contact strips for making connection between contactors 41 mounted upon a base member 42 of insulating material.

The reversing switch 33 is provided with a controller handle 43 and is suitably interlocked with the drum 39 so that only when the controller is at its zero position, or neutral position, can said reversing switch be operated. As shown in Figure 1, this interlocking connection consists of a projecting arm 44 adapted to drop into a notch 45 in the drum 39 or a connected part.

This notch and arm compel the reversing switch to remain in either extreme position so long as the main controller is off zero or neutral position.

In Figure 3 I have indicated in general the mechanical arrangement of the electrical connection being shown in Figure 1.

The drum 39 is mounted on a shaft which has bearings at its opposite ends, the lower bearing 46 being mounted in the dividing plate 47 within the cage of the controller 29, the upper bearing 48 being mounted on the top plate 49 of the case or housing. In like manner, the shaft 36 is mounted in a bearing 51 in the top plate 49 of the housing. At its center it is mounted in a bearing 52 in the dividing plate 47, and in a bearing 53 in the bottom plate 54 of the housing.

In Figure 3 I have shown two elements in the direct current control unit 31, this being shown to indicate that it may not be possible to place all of the resistance of the rheostat in one element and a plurality of elements may be put in series. The rheostat resistance conductor 55 is preferably embedded in a body of insulating material 56 in a manner well known to those skilled in the art. Where it is not convenient to provide all of the resistance in one coil, a number of such coils may be employed in series, as indicated in Figure 3. A relatively stationary contact supporting member 57 bearing contacts 58 and 59 at opposite ends of the diameter are adapted to engage with the contacts 61—61 connected to the rheostat conductor 55.

These contacts 61 are provided instead of allowing the contacts 58 and 59 to engage directly the resistance conductor, which is shown diagrammatically in Figure 1.

The movable resistance body 56 which is shown as secured through a lost motion connection to the shaft 36 bears the rings 62 and 63 with which stationary contacts 64 and 65 cooperate. Although the resistance body 56 is shown as movable for clearness in the diagram, this is preferably stationary while arm 57 rotates with shaft 36. Either method may be employed.

These rings 62 and 63 are connected at diametrically opposite points on the resistance conductor 55 as by the connections 66 and 67.

The controller 29 is provided with an indicator which in this case consists of a member 68 connected to the drum 39 and movable therewith and preferably bearing a pointer as indicated at 69, said movable member and its pointer cooperating with a suitable index disposed upon the plate 71. The direct current control member 31 passes through a series of identical cycles whereas the alternating current control member 32 passes through five positions, the connections throughout the different positions being different.

Referring now to Figure 1, the overhead trolley wires 75 are shown as supplying three phase 60 cycle current through the pantographs 76 through the changeover control mechanism 77 to the main transformers 78 and then through the secondary leads 79 in parallel through the controlling switch 81 to the motor generator set 82, and to the main alternating current motor 4 through reversing switch 83 and through the two speed control switch mechanism 84.

The main motor generator set 82 comprises the alternating current motor 85 which may be either a squirrel cage motor or a synchronous motor arranged to have its field overexcited for power factor control. The shaft of the alternating current motor 85 is connected to the shaft of the armature of the direct current generator 86. The D. C. generator 86 has a separately excited field 87 connected in series with the armature of an exciter 88, said exciter 88 having a separately excited field 89 subject to control by the D. C. control unit 31. The armature of the exciter 88 is connected to the shaft of the motor generator set 82. Likewise, a second exciter 91 has its armature also connected to the motor generator shaft and it has a shunt field 92 by which it maintains its own excitation.

The motor 85 and direct current generator 86 with the exciters 88 and 91 are preferably mounted upon a common base and direct coupled and are in constant operation so long as the locomotive is in service.

The main A. C. motor 4 has a brake member 93 which is adapted to be applied to a brake drum 94 upon energization of the coil 96. The D. C. traction motor 3 has a separately excited field 95 which is connected at all times to the exciter 91, and hence is maintained at substantially constant excitation.

The motor 3 also has a series field 97 adapted to be short circuited by the switch 98 under the control of the magnet 99. The armature leads of the D. C. motor 3 are connected through a reversing switch 101 to the armature leads of the direct current generator 86 in series relation through the wires 102 and 103. The reversing switch is adapted to be thrown to one position or the other under the influence of the magnets 104 and 105.

The exciter 91 supplies direct current for the field of the traction motor 3 and for exciting the field of the exciter 88, and also for the various control operations, as shown in Figure 1.

The switch 106 is adapted to connect the exciter 91 to the main leads 107 and 108 which supply direct current throughout the locomotive. From the positive lead 107 a branch wire 109 extends to the stationary contact finger 59 in the direct current control unit 31. A branch wire 111 from the positive lead 107 extends to the stationary contact 112 in the A. C. control unit 32. The control wire 108 carries the negative lead up to the stationary brush contact 58 in the D. C. control unit 31. Now it can be seen that the rheostat resistance wire 55 which is arranged as a closed potentiometer type resistance provides two branches between the brushes 58 and 59.

The field winding 89 of the exciter 88 which has the function of building up the field 87 of the generator 86 is connected through the leads 119 and 121 to the stationary contact brushes 64 and 65, respectively, on the D. C. control unit 31. These brushes 64 and 65 connect through the collector rings 62 and 63 to opposite points on the resistance conductor 55, as shown in Figure 1. In the position shown in Figure 1 the D. C. control unit 31 is on normal neutral position whereas the A. C. control unit is off normal by the small amount of lost motion which exists between the shaft 36 and the rotatable member 56 carrying the rheostat conductor 55. That is, in the position shown in Figure 1, the field winding 89 is subjected to neutral or zero potential, and hence the excitation of the exciter 88 is substantially zero, and likewise the excitation of the motor generator 86 is zero and the armature current for the traction motor 3 is, likewise, zero.

The stationary contact 113 in the A. C. control unit 32 is connected through a lead 122 which branches at 123 through the signal light 124 indicating that the brake is applied to the main A. C. motor 4. The opposite side of the lamp 124 is connected to return wire 125 which is cut through the relay contact 126 of the differential speed control relay 127. Thus it can be seen that if positive potential is put upon the contact 113 in the controller 32, a current will be closed through the lead 122, the magnet 96 of the brake shoe 93 on A. C. motor 4, branch lead 128 to the return wire 125 through the contact 126 to the negative lead 108 of the exciter 91.

The stationary contact 114 in the A. C. control unit 32 is connected through a lead 129. A branch 129A of said lead 129 extends through the signal lamp 132, which is marked L, and which indicates that the low speed winding of the A. C. motor 4 is closed. The opposite side of the lamp 132, which is marked L, is connected likewise through the common return 125, this common return being cut through the speed controlled relay 127. The lead 129 extends to the solenoid winding 131. The opposite side of the winding 131 is connected through a branch 125A of the common return wire 125. The solenoid 131 controls a three phase switch 133 for connecting the secondary lead 79 of the transformer 78 to the leads 134 of the low speed winding of the main A. C. motor 4.

As explained in my United States Patent No. 1,828,948, issued October 27, 1931, the stator of the A. C. motor 4 has a winding which is connected in delta with the coils in series for low speed operation and connected in star with pairs of windings in parallel for high speed operation. Hence it can be seen that closing of the switch 133 connects the winding for low speed operation through either the forward switch 135 or the reverse switch 136, depending upon the position of the reversing switch 33.

The contact 115 in the A. C. control unit 32 is connected to a lead 137. A branch thereof 137A extends to the signal lamp 139, which is marked H, and thence to common return wire 125. The lead 137 extends to the winding 138 for operating the three phase switches 141 and 142 for connecting the windings of the A. C. motor 4 for high speed connection to the secondary transformer leads 79 through either the forward switch 135 or reverse switch 136.

The remote end of the winding 138 is connected to the branch 125A of the common return 125.

The stationary contact 116 in the A. C. control unit 32 is connected through a lead 143 to the magnet winding 99 of the switch 98 for cutting out the series field winding 97 of the D. C. traction motor 3. The remote end of the winding 99 is connected to a wire 144 leading directly to the negative common wire 108. It will be noted that the return for the series field cutout switch is not cut through the differential relay 127, since the cutting out of the seres field has no relaton to the speed of the A. C. motor, as will become more apparent later.

The stationary contact 117 in the A. C. control unit 32 is connected by a lead 145 to the solenoid winding 146 of the low speed control switch 147 of alternating current motor 148. This motor 148 is a squirrel cage induction motor of the same type as the traction motor 4, and it is also provided with windings adapted to be connected for high speed or low speed operation, just as the traction motor 4 is.

The remote end of the winding 146 is connected directly to the common negative wire 108.

The stationary contact 118 in the A. C. control unit 32 is connected by a lead 149 to the solenoid winding 151 which operates the switches 152 and 153 for connecting the windngs of the motor 148 in parallel with the leads extending to the main traction motor 4.

It will be observed that the leads 154 extend from the motor 148 to the motor side of the reversing switches 135—136 so that the motor 148 is operated in all respects as is the main traction motor 4.

The remote side of the winding 151 is connected directly to the common negative lead 108.

The motor 148 is a driving unit of the motor generator set 155 having a direct connected D. C. generator 156, the armature of which is directly connected to the winding 157 of the differential relay 127. The direct current generator 156 has a separately excited field 158 which is connected across the main D. C. leads 107 and 108.

The main traction motor 4 has connected thereto in direct coupled relation, or the same relation as exists between the motor 148 and its D. C. machine 156, a small direct current generator 159 which has its armature connected directly to the winding 161 of the differential relay 127.

The small generator 159 has a separately excited field 162 which likewise is bridged directly across the positive and negative leads 108 and 107 in the same relation as the field winding 158 of the generator 156 is so connected.

The function of these two generators 156 and 159 is to insure synchronism between the traction motor 4 and the secondary transformer leads 79 before the low speed or high speed connections of the windings of the main traction motor 4 can be connected to the source of power through the leads 79. Since the fields of these two generators are excited from the same source at all times their excitation is substantially equal, or is made so, and the voltages delivered by the armatures are intended to be the same for equal speeds of the armatures. Under these circumstances the two windings which are opposed to each other will not open the contact 126 of the relay 127. Hence, when neither winding 157 or 161 is excited or both are excited equally the relay contacts 126 will be closed.

The reversing switch 33 which forms a part of the controller 29 comprises stationary contacts 164, 165 and 166. The stationary contact 166 is connected to the positive lead 107 at all times.

The stationary contact 165 is connected to the reverse lead 167 which has a branch 168 leading to the solenoid 104 for switching the reversing switch 101 to reverse position for the D. C. traction motor 3.

The lead 167 continues to the solenoid winding 168 of the reverse switch 136. The remote terminal of the winding 168 is connected to a branch 169 of the common negative return wire 108.

The stationary contact 164 in the reversing switch 33 is connected to the forward lead 171 extending to the solenoid winding 172 of the forward main alternating current switch 135. A branch 173 of said forward lead 171 extends to the solenoid winding 105 for closing the reversing switch 101 for the D. C. traction motor 3 in the forward direction.

The reversing switch has a cylinder bearing a common ring or segment 174 for maintaining contact with the stationary contact finger 166. The drum also has a segment 175 which is adapted to connect the common segment 174 with the stationary reverse contact 165. The drum also has a segment 176 adapted to connect the common segment 174 with the stationary contact 164 for closing the forward lead 171 to the positive control wire. Briefly, the operation of the reverse switch 33 is to close the circuit from positive wire 107 to either the forward wire 171 or the reverse wire 167 to condition the motor drive for either forward or reverse drive of the locomotive.

The drum 39 of the main A. C. control unit 32 has a long segment 177 which extends over substantially the complete active surface of the A. C. control unit 32. This segment 177 is adapted to be connected at contact 112 to the positive common wire 107.

It is to be observed that the lost motion connection, previously referred to, permits of a small independent motion of the A. C. control unit 32 before the D. C. control unit 31 is moved. Likewise, a final movement in the opposite direction of the A. C. control unit 32 is permitted by the handle 34 after the main D. C. unit 31 has been stopped. That is to say, there is a small free movement of the A. C. control unit 32 by the handle 34 in either direction without moving the D. C. control unit 31. As shown in Figure 1, this motion has been taken up, that is to say, the drum 39 has been advanced in a counter clockwise direction far enough to bring the segment 177 well under the contact 112.

A short connected segment 178 is engaged with the stationary contact 113 as soon as the drum 39 is moved off neutral. The large segment 177 is at all times, when the drum is off neutral, connected to the positive common wire 107 so as to supply control to the various control wires through the segment and contact of this controller.

The gear ratio between the D. C. control unit 31 and the A. C. control unit 32 is of the order of 3 to 1. That is to say, the unit 31 makes substantially three complete turns for one complete turn of the unit 32.

It will be seen that the drum 39 has been divided into five divisions which are indicated by the reference letters A, B, C, D and E. Between divisions A and B is an idling section X, and between divisions C and D is a second idling section Y.

By reference to the diagram of Figure 8, the corresponding steps in the operation of the locomotive will be understood. The five stages of operation of the locomotive represented on the diagram of Figure 8 correspond to the corresponding divisions of the A. C. control unit 32. Since the D. C. unit 31 and the A. C. unit 32 are coupled together, it will be apparent that the D. C. unit will go through a series of identical cycles, as will be more fully described later.

The operation of the system thus far described is as follows:

Referring, first, to Figure 1, assume that the drum 39 is rotated to the position where the notch 45 registers with the short arm 44 of the reversing switch 33, which is at full neutral position, when the positive wire 107 is cut off of segment 177. The first motion of the controller handle 34 turns the A. C. controller drum 39 into the position shown in Figure 1. In so doing the contact brush 112 puts positive potential on the long segment 177. Also, by the interconnection between the segments, all of the segments being connected as indicated on Figure 1, the engagement of the short segment 178 with the stationary contact 113 closes the circuit through the brake applying lead 122 for energizing the winding 96 for applying the brake 93 to the drum 94 of the A. C. traction motor 4. This holds the said motor stationary.

It is assumed that the reversing switch 33 is in forward position. That is to say, the segment 176 on the drum of the reversing switch 33 engages the contact 164 and puts positive potential on the wire 171. This through the branch 173 energizes the solenoid winding 105 to close the D. C. reversing switch 101 in the forward direction, and to close the A. C. reversing switch 135 in the forward direction.

The main motor generator set 82 is in operation as the switch 81 is closed when the locomotive is put into service the A. C. motor 85 driving the generator 86 and the exciters 88 and 91, the exciter 91 supplying direct current for the switching operation and for energizing the field 95 of the D. C. traction motor 3 and also supplying excitation for the speed controlled generators 159 and 156.

The D. C. control unit 31 standing in the position shown in Figure 1 impresses no potential upon the field winding 89 of the exciter 88, and hence the main generator 86 of the motor generator set 82 is not excited and the D. C. traction motor has no armature current.

It will be observed that the circuit for the brake winding 96 is cut through the contacts of the speed sensitive relay 127. The reason for this is that the brake 93 is not intended as a brake for the kinetic energy of the A. C. motor 4 but is intended only as a holding brake for holding the armature against rotation so as to permit the sun pinion 15 in the differential gear 16 to be held stationary whereby the direct current motor pinion 11 can drive the orbit gear and the cage, and by the reaction against said sun pinion 15 drive the driving axle 1.

If the speed sensitive relay 127 should have its winding 161 energized by motion of the generator 159, the circuit would be opened at 126 and the brake could not be applied.

Instead of a brake 93 applied to a drum 94 the main traction motor 4 may have direct current excitation for holding the armature against rotation, or substantially against rotation to provide the necessary reaction for the differential gear to drive the axle 1 from the direct current motor 3. In other words, it is not necessary to hold the main motor armature absolutely stationary, but only relatively so where the direct current motor is to drive the axle. Assuming, however, that the main A. C. motor 4 is at zero speed when the operation is started, the brake will be applied as soon as the segment 178 in the control unit 32 engages the contact 113. Further motion of the control handle 34 now rotates the rheostat drum 56 in respect to the brushes 58 and 59 which apply negative and positive potential, respectively, to the rheostat conductor 55. The rheostat conductor 55 in this operation acts like a potentiometer to vary the potential applied to the field winding 89.

With the parts 31 and 32 geared together, as shown in Figures 2 and 3, and the controller drum 32 moving in a counter clockwise direction the D. C. controller drum will be moving in a clockwise direction, with the result that the connection 67 between the rheostat winding and the generator field lead 121 approach each other.

Likewise, the connection 66 and the positive brush 59 approach each other whereby the potential impressed upon the field 89 for driving the motor 3 in a forward direction is increased. The exciter 88 and generator 86 for this purpose are linked for magnifying the current flow applied to the D. C. motor armature 3. As the exciter 88 is energized, and it in turn excites the generator 86, said generator 86 through the leads 102 and 103 and in series with the series winding 97 applies current to the traction motor 3. The two field windings 95 and 97 react upon the armature and provide a high starting torque for starting the locomotive from rest. With the continuous clockwise motion of the rheostat drum 56 a point in the cycle will be reached where the maximum excitation of the generator 86 is approached and maximum potential will be impressed upon the traction motor 3. This corresponds to the line A on Figure 8 and consists in the acceleration of the locomotive by the D. C. traction motor 3. As the end of this stage approaches the segment 179 approaches the brush 116 and when it makes contact, it closes a circuit through the series field cutout switch magnet 99 for closing the switch 98 to cut out the series field 97. The traction motor 3 is then put under the control of the separately excited shunt field 95 only and, hence, a definite speed corresponding to a definite setting of the control unit 31 will result. As the end of the cycle A is further approached the segment 178 will leave the brush 113 releasing the brake 93 on the main traction motor 4.

If the controller handle were stopped here the D. C. motor would tend to idle the A. C. motor. However, the operator does not wait for this to occur but rapidly moves the controller through a motion of substantially 180° to drive the direct current motor 3 in the reverse direction at substantially maximum speed. The controller is preferably provided with control notches throughout the active half of each cycle and a click roller as indicated on Figure 1 so that the operator can feel when he has approached the condition where the controller is to be moved rapidly to reverse the direct current motor 3. The reason for reversing the direct current motor 3 is to bring the alternating current motor 4 to substantially synchronous speed in the proper direction to permit it to drive the axle 1. Since the gears are differential gears, the motor which supplies the power must gain its torque reaction from the other motor, and if said other motor is free to rotate it will merely be rotated in the opposite direction without driving the load. Hence, it is necessary, first of all, for bringing the motor 4 to synchronism in the right direction for the D. C. motor 3 to be reversed to substantially maximum speed, and, as will appear further from the scheme of operation represented in Figures 8, 9 and 10, the direct current motor 3 serves, as soon as the alternating current motor 4 supplies the power, to provide the variable regenerative component for accelerating the locomotive.

That is to say, as soon as the segment 182 closes with the stationary contact 114 the main traction motor 4 is connected to the line with its windings arranged for low speed.

During the idle motion represented by the sector X on the drum 39 contact 181 engages the stationary finger 117 and puts the synchronous control motor 148 upon the main line with its windings arranged for low speed.

The sector X is idle so far as applying any drive to the load is concerned, and its action is represented by the vertical line X on the diagram of Figures 8 and 10. The synchronous control motor 148 is started ahead of the main traction motor 4 in order that the contact 126 will be opened to effect the synchronous control. If the two motors 4 and 148 were started simultaneously, they might accelerate at the same rate and, hence, the synchronous control would not be effective. It is to be remembered that the speed of the D. C. traction motor 3 is made such that when full excitation is applied by the rheostat 31 to the field winding 89 the motor 3 will be driven at a speed slightly greater, say by way of example 120% of that required for driving the A. C. motor at synchronous speed, the theory being that if the load should slow down, as would necessarily be the case on a grade, it is advisable to have the D. C. motor overspeed sufficiently that with the reduced speed of the axle 1 the A. C. motor 4 may be brought to substantially synchronism.

As soon as the segment 182 engages the contact finger 114, potential is applied to the lead 129 for connecting the motor with its low speed winding to the line by operation of the solenoid 131, but if the synchronizing control relay 127 is unbalanced, the circuit will be open at 126, hence, the mechanical driving of the A. C. motor 4 and the electrical driving of the synchronizing control motor generator set 155 must substantially coincide before the motor 4 can be connected to the main A. C. line. Since the tendency is for the D. C. traction motor 3 to drive the A. C. motor above synchronism before the segment 182 contacts with the finger 114, further motion of the controller handle may be required to reduce the speed of the D. C. traction motor 3 before the synchronous control relay 127 will permit the main A. C. motor 4 to be connected across the main A. C. line. As soon as the A. C. motor 4 is connected to the main line for low speed it drives the axle 1 in a forward direction and tends to overspeed the direct current motor 3. Such tendency to overspeed the direct current motor 3 causes it to act as a generator to pump current back through the leads 102 and 103 to the generator 86 of the motor generator set 82 thereby tending to drive A. C. motor 85 above synchronous speed but, in so doing, encountering the electric load of generating A. C. and forcing the same on to the main line 79. This current may be considered as a circulating current running to the main A. C. motor 4.

In other words, the excess motion of the A. C. motor 4, which is not applied to driving the load, is applied to driving the D. C. motor 3 as a generator, and so much of the power as is so applied is regenerated.

As previously explained, the D. C. traction motor in starting the load brings it up to approximately 20% of speed, as above explained, then the A. C. motor brake is released and then the D. C. motor is retarded to zero speed and then reversed, and accelerated to full speed reverse, as indicated by the line X on Figures 8 and 10, to accelerate the A. C. motor armature which has been released in the meanwhile. The A. C. motor armature under the influence of the D. C. motor and the moving axle is rotating at a speed which, if it were all applied to the axle 1, would drive the load at 40% of its full speed. The synchronizing relay now permits the A. C. motor to be connected across the line. It can be seen, therefore, that at the time that the main A. C. motor 4 is connected to the line and starts to drive the load, the load is moving at only half of the speed at which this A. C. motor 4 could drive it with its low speed winding and, therefore, the D. C. motor is driven at substantially full speed in the reverse direction. Now by further shifting of the D. C. controller, the excitation of the field 89 is decreased, tending to cause a larger and larger current flow in the lines 102 and 103 stalling the armature of the D. C. motor 3 which is acting as a generator thereby decelerating said D. C. motor 3. While the A. C. motor carries an ever increasing percentage of the load until the locomotive reaches 40% speed when the D. C. motor is standing still.

The controlling action then proceeds with respect to the A. C. drum in the segment C, the D. C. controlling drum 56 continuing and causing the direct current motor 3 to reverse with respect to its previous rotation and to move in the forward direction.

Its operation then becomes a motor and it adds its speed and power to that of the A. C. motor 4, as represented by the line C on the power demand curve of Figure 8. As the A. C. controller 32 approaches the end of the cycle C, the segment 182 leaves the stationary contact finger 114, thereby opening the switch 133 which controlled the closing of the low speed winding of the motor 4. The motor 4 is then under the control of the axle 1 and the D. C. motor 3. The controller is then rapidly shifted through the sector Y on the drum 39, the line Y on the diagram of Figure 8 representing this action. During this motion the segment 181 leaves the low speed relay contact finger 117 to open the switch 147 of the synchronizing control motor generator set 155 and thereupon closes the switches 152 and 153 to connect the motor 148 of the synchronizing controlling motor generator set 155 for high speed operation. This is done by engagement of the segment 183 with the contact finger 118. Such action immediately causes opening of the common return wire 125 at the point 126 until the A. C. motor 4 is brought to its second synchronous speed, that is, to approximately 1200 R. P. M. Continued motion of the controller handle moves the D. C. and A. C. units 31 and 32 to cause reversal of the D. C. motor 3 to its maximum speed, thereby bringing the A. C. motor 4 to its high speed, that action being secured in conjunction with the moving axle 1.

Thereupon the segment 184 engages the contact finger 115 to close the switches 141 and 142 for connecting the A. C. motor 4 for high speed operation to the main A. C. line. The result then is, again, that the D. C. motor 3 in conjunction with the load tends to drive the A. C. motor 4 above its high synchronous speed to avoid failure to attain synchronous speed by slowing down of the load. As soon as the A. C. motor 4 is at synchronous speed, and this is determined by the synchronous controlled relay 127, the switches 141 and 142 will be closed and the motor 4 then applies its torque to the axle 1 and to the D. C. motor 3, driving said D. C. motor 3 at substantially its maximum speed in the reverse direction as a generator and it, in turn, pumping power back through the leads 102 and 103 to the alternating current motor 85 acting as a generator for supplying regenerated power to the main A. C. line 79. As the D. C. controller decreases the excitation of the field winding 89 of the exciter 88, the D. C. motor 3 slows down to zero speed, the main A. C. motor then alone driving the axle 1 and bringing it to 80% of its rated speed. As the controller is further shifted into the sector E, the D. C. motor 3 is driven in a forward direction and is accelerated to its maximum speed, this being added to that of the A. C. motor operating on its high speed winding with the result that the load is brought to 100% of its maximum rated speed in the forward direction when the controller handle has reached its limit.

It will be obvious that reverse operation is no different, the reversing switches for the A. C. motor and the D. C. motor being merely reversed.

The motorman can be apprised of the condition of the drive at any instant by suitable indicating instruments and he can tell the main actions from the three signal lights indicating the brake, the low speed motor connection and the high speed motor connection.

Assume that when the speed is at a maximum and the load approaches a downgrade, the locomotive will automatically tend to hold the speed for which the controller is set, automatically regenerating the work done by the load in descending the grade at that speed. If the controller is set for a lower speed that speed will be maintained and regeneration automatically occurs as before. Likewise when running on the level the speed for which the controller is set will be automatically maintained. If power is required to maintain that speed it will be taken from the line. If the load is moving faster than the corresponding setting of the controller, the locomotive will regenerate the excess power. So by backing the controller off lower speed can be compelled the kinetic energy being transformed by regeneration into electrical energy.

For example, in braking a moving load from 100% speed, assume that the controller is in its full position. Now by reference to Figure 8, it may be seen that the tendency of the load to drive the motors above 100% speed will be met by a regenerative effect in both the A. C. motor 4 and the D. C. motor 3. By moving the controller to decrease the energization of the field 89, the motor 3 will tend to assume its corresponding fixed speed, which will be less than its full speed, but if the load has a tendency to drive it at a higher speed, it will operate as a generator. Therefore, in the triangle having the side E in Figure 8, power will be regenerated both by the A. C. motor 4 and the D. C. motor 3, since the torques upon these motors as modified by the mechanical advantage is the same. As the controller is moved back to substantially neutral position the D. C. motor 3 will be held at substantially zero speed, and the entire regenerative effect will come upon the A. C. motor 4.

As the speed drops below this point, if the D. C. motor 3 should remain at zero speed, the A. C. motor would cease regenerating and would merely idle at a fixed speed which would be approximately 80% of the full load speed. However, by speeding up the D. C. motor 3 in the reverse direction, that is by acceleration of the motor 3 in the reverse direction, the regenerative effect is crowded upon the A. C. motor and the load is thereby braked along the line D to a point where the full reverse speed of the D. C. motor 3 will not hold the A. C. motor up to its maximum speed. The controller is then shifted through the Y position to put the synchronizing control motor generator set 155 on low speed operation and then to put the windings of the main generator on low speed operation, and to put the D. C. generator 3 as an additional regenerative load cooperating with the regenerative load of the A. C. motor 4. Deceleration then proceeds down the line C, the D. C motor 3 decelerating down to a point where the load is at substantially 40% of its full speed. Then the motor is reversed and is gradually accelerated to hold the A. C motor up to regenerative speed until the load is brought down to substantially 20% of its speed. Then the idle motion of the A. C. control unit 32 is passed, that is the position X, and the A. C. motor is brought to zero speed, the brake applied, and if the series winding be kept out of operation, the regenerative braking by the D. C motor 3 may be carried down to substantialy zero.

When the series field winding 97 is cut into the circuit, regeneration becomes unstable and, in the form of the invention illustrated, air brakes or other means may be employed for braking down to standstill. It is entirely within the scope of the invention, however, to keep the series field out of operation on regenerative control as far as may be desired.

While I have described the above operations of the locomotive for three phase power supply, it is to be understood that the locomotive may operate equally well on single phase. That is to say, the present construction, shown in Figures 1 to 9, inclusive, is designed for either three phase or single phase interchangeably. This is accomplished by the changeover mechanism illustrated diagrammatically at 77 in Figure 1. The utility of this single phase operation resides in the ability to avoid intersection of three conductor trolleys, all as explained in my United States Patent No. 1,828,945. In connection with the synchronizing control generator set 155 having two speeds it is to be noted that I may have either two such motor generator sets, one operating at low speed and the other at high speed, or I may introduce a gear relation for driving one generator from the motor 148 at low speed and the other at high speed, and then switch connections to the relay 127 without departing from the invention. The function of the relay 127 is to tell whether the A. C. motor 4 has been brought up to the proper synchronous speed before its switch can be closed to line.

Likewise, the relay tells whether the A. C. motor 4 has been brought to substantially zero speed for permitting the D. C. motor 3 to drive the load alone.

In Figure 7 I have shown a more extensive diagram of the connections of the locomotive, showing the chief operating units of the same. This locomotive has four driving axles and has the four main A. C. motors indicated at 4A, 4B, 4C and 4D. Each main A. C. motor has its auxiliary D. C. motor 3A, 3B, 3C, and 3D, respectively. In this case the motor generator set, which supplies direct current for the D. C. traction motors, is of sufficient capacity to supply all of the D. C. motors, but in the illustration chosen, the motor generator set has only one-fifth the power requirement of the output of the locomotive. A liberal margin is desirable above the theoretical capacity. The motor 85 in this case is made a synchronous motor with a suitable direct current field. Instead of using a single two speed synchronous control motor generator set, I have shown two sets, 155H for high speed, and 155L for low speed. The auxiliary apparatus for controlling the transformer connections from three phase to single phase, and vice versa, have also been shown. The pantograph control mechanism has also been indicated. Likewise, the interlock with the air brake has been shown. The control wires by which multiple unit control may be secured are shown as cabled together at 302, brought on to suitable terminal blocks 303 at each end, and provided with slip couplings as at 304. By this connection any locomotive may be made the controlling station for the operation of any suitable number of connected units.

Referring, first, to the pantograph collectors 76A and 76B, these pantographs are provided with three collector shoes each, one of the pantographs, such as 76A, being placed at the forward end of the locomotive or car, and the other pantograph collector 76B being located at the other end. These pantograph collectors, as explained in my United States Patent No. 1,828,945, granted October 27, 1931, have three separately movable shoes for engaging the three trolley wires. The two outer pantograph shoes may, in one form of my invention, be raised and lowered independently. In another form of my invention the three pantograph shoes are connected to a common structure but insulated from each other and by disposing the central trolley wire at a higher level than the two outer trolley wires, a crossing on single phase single trolley wire may be effected. The pantographs are preferably provided with raising and lowering cylinders, which cylinders for each pantograph may be separately controlled. This is more fully explained in my Patent No. 1,828,946, granted October 27, 1931.

The crossing of trolley wires is avoided. Under normal conditions three trolley wires are used; at turnouts two trolleys furnish single phase energy; at crossovers in switch yards and at other places where even two trolley wires would entail structural and operating difficulties, a single trolley wire with a grounded neutral track return is used. The characteristics of the traction motors, above mentioned, make it practical to use three, two or one trolley wire to best suit local conditions. Where three trolley wires are in contact with the collectors, three phase current is supplied; where two trolley wires are in contact with the collector, single phase current is supplied, and where one trolley wire is employed in connection with neutral return, single phase from one phase to the neutral connection furnishes the power.

The three trolleys are spaced, for example, approximately three and three-quarter feet (3¾') apart. All three wires are suspended at the same elevation. For high speed service, each wire is suspended from a catenary messenger.

At a turnout the outer wire is carried through on the middle track, the middle wire branches and the inner wire is carried into the turnout. This construction provides two wires over each track.

At a crossover to another track the outer wire is carried through on the main track, the middle wire branches, and the inner wire is discontinued. This gives two wires over the main track and one wire over the turnout.

At switching yards the middle wire only is utilized.

Because of the high voltage that can be used on trolley wires, the amount of current to be collected is comparatively small. For example, with a three phase 13,200 volt system 100 amperes per collector at .85 power factor equals 1950 kilowatts. The A. C. collectors may, therefore, be of comparatively light construction.

A pantograph supported in the usual way is not well adapted to this system because the lateral movement of the three collectors with reference to the trolley wires would be greater than desirable. To overcome this difficulty, I have developed a compensating device which practically neutralizes the effect of sideswaying of the locomotive. This device is disclosed in my Patent No. 1,828,945, granted October 27, 1931.

With the elimination of the effect of sidesway, the length of the collector pans may be so reduced that three pans may be mounted in the width of the locomotive.

The pantograph is raised by springs, the pressures of which are adjusted to give proper pressure to the three collectors against their respective trolley wires. It is also equipped with two air cylinders. Each cylinder is used to neutralize the pressure of the spring of one outer collector against its trolley wire. When the locomotive enters a single phase zone, air pressure is automatically applied to the proper cylinder or cylinders at the same time that the switching change is made from three phase to single phase in the transformer. This assures a constant pressure at all times against each trolley wire, whether the locomotive be collecting current from one, two or three wires.

At the top of the pantograph the collector of each phase is spring mounted on its own independent support. Each spring is adjusted to give the proper pressure against each trolley wire. Each of the outer collectors is also equipped with an air cylinder, which is connected by flexible metallic hose in multiple with the air cylinder located directly below it at the base of the pantograph. When the locomotive enters a single phase zone and air pressure is applied to the main cylinder, it is simultaneously applied to the auxiliary cylinder.

The air pressure then overcomes the spring pressure and lowers the collector so that it clears the trolley wire of the adjacent phase that turns out across its normal path. As an alternative scheme, the spring pressure may be sufficient only to apply the proper pressure for one shoe against its trolley wire, for example, the central shoe, and by means of an air cylinder additional pressure may be brought upon the pantograph to apply the proper pressure for the outer shoes.

The pantographs 76A and 76B are connected through reversing switches 181A and 181B to the main leads 306 extending to the transformer 78.

Across the outer phases A and C I connect a transformer winding 304 for operating the switchover relay 185. This relay has a contactor adapted, when lowered, to close a pair of contacts 187, and when raised to close a pair of contacts 188. The relay has a solenoid winding 189 which is connected in series with the secondary 191 of the transformer 192 through a resistance 193. One side of the relay is grounded at 194 and the opposite side of the relay is connected by wire 195 to a contact shoe 196 carried by the locomotive truck and adapted to engage a track contact, such as 197, for causing the relay 185 to drop its contactor 186 to close the contact 187. The contact shoe 196 thus shunts the winding 189 of the relay 185, causing it to become deenergized sufficiently to drop its contact.

When the contactor 186 drops it energizes the winding of relay 199 causing it to close a circuit through the control wire 200 from the positive lead, marked + to the solenoids 201, 202 and 203 for switching the transformer 78 to single phase connection. The secondary windings of the three phase transformer 78 are connected in star permanently. By closing the switches 204, 205 and 206 the primary windings, of which each phase has a pair, are connected together in delta between the B phase primary lead and ground with a pair of windings in parallel in each leg of the delta. The locomotive then operates single phase until it emerges from the single phase zone.

The shoe passes off the third rail as soon as the locomotive has entered the single phase zone. As the potential transformer 192 is then deenergized the relay 185 does not pick up. The shoe then makes contact again on leaving the single phase zone so that the three phase connection is not made until the outer collectors have fully established contact.

When the shoe 196 passes off of the third rail 197, as will occur upon emergence of the locomotive from a single phase zone the relay 185 is energized to close its contact 188 and energize the two relays 207 and 208 together. The relay 208 controls, through the control wire 209, the windings 210 and 211 for operating the switches 212 and 213. When these switches 212 and 213 are closed, the primary windings of the three phase transformer 78 are connected in delta between the three phases with the pairs of windings in each leg of the delta in series.

Energization of the relay 207 closes a circuit for the valve control magnets 214A and 214B for admitting air pressure to the air cylinders for exerting extra pressure upon the pantographs where the normal spring pressure is only sufficient to supply pressure for a single trolley wire.

The closing of the circuit for the magnets 214A and 214B is from a common control wire 215 which is cut through the contacts of a switch 216 to positive common. The switch 216 controls the lowering and raising of the pantographs. That is to say, when the switch is pushed in to the right, as viewed in Figure 7, Part III, the pantographs are positively lowered and when the switch is pulled out, the pantographs may be raised or may be lowered under the control of the relay 207. The switch 216 is one of a bank of control switches put in the cab of the operator. It includes a switch 217 controlling the oil circuit breaker 218, appearing on Part I, through the operation of a control wire 219 which energizes the solenoid 220. The oil circuit breaker 218 has an auxiliary off-normal switch 221 which governs the energization of the lowering magnets 223A and 223B since their common wire 224 is adapted to be connected to wire 222 at the switch 216 when the switch is pushed in to lower pantographs. The individual wires for said lowering magnets 223A and 223B are cut through pantograph control switches 225A and 225B, respectively. These individual control wires are shown at 226A and 226B, respectively.

The control switch bank 227 also includes a hand switch 228 for manually controlling the exertion of extra pressure upon the pantograph, if desired, this switch 228 being connected in multiple with the relay 207 through wire 229. The return for said extra pressure applying magnets 214A and 214B is, as above recited, through the control wires 226A and 226B which are cut through the snap switches 225A and 225B for selecting or putting into action the pantographs 76A or 76B.

The switch 230 in the bank 227 is adapted to control the raising of the pantographs. The magnets 231A and 231B are employed for this purpose. The magnets may trip out a holding hook or they may operate a magnet valve for allowing air pressure to raise the pantographs, if desired. These magnets are connected to a common control wire 232 and the individual returns of the magnets 231A and 231B are through the individual return wires 226A and 226B which, as above explained, are cut through the pantograph control switches 225A and 225B, respectively.

Another bank of switches 233 in the cab of the operator control the air compressors, the heaters, blowers, the main motor generator set and the synchronous motor field of said motor generator set. The switch 234 governs the common wire 235 which controls the motors for the air compressors 236A and 236B. This common wire is cut through a pressure regulator 237 and separate snap switches 238A and 238B control the switches 239A and 239B of said air compressors, respectively, through suitable solenoid coils 240A and 240B. These solenoids are connected through individual wires 241A and 241B, respectively, so that either or both air compressors may be put in service by the snap switches 238A and 238B and both under the control of the pressure regulator 237.

The heater switch 242 governs a control wire 243 for cutting in the heaters 244A and 244B, respectively, through solenoid control switches 245A and 245B. The heaters themselves are connected across two phase wires of the main leads on the secondary side of the transformer, these main leads being phase wires and indicated throughout the diagram of Figure 7 by the reference letters A, B and C.

The blower control switch 246 governs a control wire 247 leading to the solenoid switch 248 on Part II for closing the circuit of the motor operating the blower 249. The blower 249 is adapted to cool the D. C. motors 3C and 3D. A branch wire 250 of the wire 247 controls the solenoid switch 251 for operating the motor of the blower 252 which cools D. C. motors 3A and 3B.

The control switch 253 in the bank 233 governs a control wire 254 which extends over onto Part II and governs the solenoid switch 255 for closing the A. C. winding of the synchronous motor 85 to the transformer secondary leads A, B and C. The direct current field of said synchronous motor 85 is shown at 256. The connection of this field to the direct current supply leads + and 0 is governed by solenoid switch 257. This switch is under the control of wire 258, said wire in turn being governed by the synchronous motor field control switch 259 in the bank 233.

It is to be noted that the ventilating motors 249 and 252 are shown as bridged across the phases A and B, but it is to be understood that these blower motors might be three phase motors, if desired.

The relation between the controller 29 and the A. C. and the D. C. traction motors, 4 and 3, respectively, is the same as explained in connection with Figure 1.

In the reversing switch 33' the stationary contact 59, which supplies positive direct current to the direct current rheostat wire 55, is cut through a separate contact 261 instead of being directly connected to the contact 166, so that the reversing switch must be in either forward or reverse position before the direct current control unit 31 is effective.

A switch 262 controls the application of direct current to the said controller 29, and when the motorman wishes to put the controller 29 into service he closes the switch 262, which puts positive potential from the main positive wire 263, which leads directly to the exciter generator 91, onto the wire 107 which supplies the control for both the A. C. control unit 32 and the D. C. control unit 31 of the controller 29, and also closes the circuit from the main negative or common return wire 264 onto the wire 108 for giving the direct current control unit 31 its negative potential.

The leads to the stationary fingers 113, 114, 115, 116, 117 and 118 are all grouped in the cable 302. Likewise, the forward and reverse control wires 171 and 167 are included in the cable. The main negative control wire 264 is also cabled in the control cable 302. Likewise, the synchronous speed control wire 265 is included in the cable 302.

The synchronous speed control wire 265 is connected in series with the wire 125 through the brake controlled switch 260. The switch 260 is closed only when the brake handle is in one of its released positions. The direct current variable potential leads 266 and 267 which in reality are variable potential busses for controlling the excitation of the field 87 of the direct current generators of the motor generator sets throughout the connected units. That is to say, these variable potential direct current leads 266 and 267 are cabled into the connecting sockets 304 for coupling to adjacent units so that the fields of the various direct current generators of the motor generator set of the respective units are all controlled simultaneously. The variable potential leads 266 and 267 from which the field 87 of the generator 86 is supplied with current are fed directly from the exciter armature 88 through the leads 268—269, respectively, through a control switch 270 closed by a magnet 271 which is energized over the lead 272 by closing of the control switch 262 which puts the controller 29 into action. That is to say, the control switch 262 which puts the controller 29 into action also causes the exciter 88, which is governed thereby, to control the potential of the variable potential leads 266 and 267.

In a connected locomotive or unit which would be joined to the locomotive shown in Figure 7 to the coupling 183 the field winding 87 of such coupled locomotive would then be excited from the variable potential busses 266 and 267 as the exciter switch 270 of that locomotive would be opened.

The control of the magnet switch 255 for the motor generator set motor circuit is individual to each locomotive. Likewise, the control of the magnet switch 248 for the blower is individual to the locomotive, these circuits being closed when the unit is put into operation.

The field winding 87 is connected to the variable potential busses 266 and 267 by the leads 274 and 275. Hence all connected units have their generator fields excited to the same degree throughout the various stages of control.

The synchronizing control relay 127 which has the differential windings 157 and 161 performs the same function as before described. The winding 157, however, instead of being connected to only one direct current generator driven at two different speeds is adapted to be connected selectively to either the low speed generator 156L or the high speed generator 156H to determine whether or not the main A. C. traction motors 4 are in synchronism for low speed or high speed, respectively.

The magnet switches 275 and 276 selectively connect the winding 157 to either the low speed generator or to the high speed generator, this control being exercised through the stationary contact fingers 117 and 118 in the controller over the wires 145 and 149, respectively.

The motors 148L and 148H are connected to the secondary of a transformer 277, the primary of which is connected through a suitable circuit breaker 278 to the main three phase leads 279 which are supplied with current from the secondary in the main transformers 78.

The switch 278 is connected to the main A. C. leads on the remote side of the reversing switches 135—136. Hence, the reversal of motors 148L and 148H is controlled simultaneously with the reversal of the main A. C. traction motors 4. The motors 148L and 148H are provided with disconnecting switches 281L and 281H.

The fields of the synchronism controlling generators 156L and 156H are bridged across the positive and negative leads 263 and 264 which also extend to the field winding 162 for the synchronism controlling generator 159 connected to the A. C. main traction motor 4A. It will be observed that only one such speed controlled generator is required as the speed of all of the main motors will be the same, they being connected together in parallel across the leads 280L or 280L for high or low speed operation, respectively. The field winding 162 is connected by leads 283 to the positive and negative conductors 263 and 264 and the fields 158H and 158L are likewise connected to the positive and negative leads by the leads 282 shown in Part III.

Suitable disconnect switches 284 for the main A. C. traction motors are provided to cut the motors out of service, if the same should be desirable. In like manner, disconnect switches 285 are provided for the fields of the direct current motors 3A, 3B, 3C and 3D. Also a bank of disconnect switches for the armatures of these motors is shown at 286.

In series with the armature disconnect switches 286 the armature circuits pass through a reversing switch bank 101. The operation of the armature circuit reversing switches 101 is controlled by two operating coils 104 and 105 which are arranged in series with a changeover switch 287 to cut out the corresponding operating coil after it has shifted the switch and transferred the circuit to the other coil and its control wire. These operating windings 104 and 105 are operated over wires 288 and 289 which form extensions of the reverse and forward wires 167—171 extending to the reversing switch 33' in the controller 29.

The series fields 97A, 97B, 97C and 97D for the direct current motors 3A, 3B, 3C and 3D are arranged to be short circuited by corresponding short circuiting switches 98A to 98D by operating coils 99A and 99D which are both connected in parallel between the series field cutout wire 143 and the negative common return wire, through the branches 143A and 143D.

The brake coils or direct current excitation coils 96A—96D are all energized in parallel by branches between the brake control wire 122 which gets positive potential from the segment 178, as shown in Figure 7 Part III, the return circuit being through the wire 265 which extends up to the off-normal contacts 260 on the brake handle and back through the wire 125 to the synchronous control relay switch 126, and if the said relay is closed, then to negative potential by way of wire 264, which is the main negative wire.

The coil 161 of the synchronous control relay 127 is connected directly to the armature of the speed control generator 159 driven by the main A. C. motor 4A over the wires 292 and 293.

The field 89 of the exciter 88 is directly controlled by the direct current control unit 31 over the wires 121 and 119 which are subjected to variable potential in the direct current control unit 31.

The direct current wires 102 and 103 which are connected in parallel to the four direct current traction motors through the disconnect 286 is provided with a disconnect switch 295.

The main positive and negative bus wires 263 and 264 are connected to a battery 296 which is floated on the line through regulators 297 when the direct current exciter generator 91 is in action. A cutout switch 298 is provided. A suitable switch 299 controls the light circuit 300 for each locomotive. Since each locomotive must have its own motor generator set in operation for operation of the locomotive the battery circuit and the positive and negative bus wires 263 and 264 may be individual to each locomotive only control wires extending through the multi-unit connection or coupling 304.

This battery 296 may be employed for starting the motor generator set 82 in case it should become stalled in a single phase zone or the like. A suitable starting switch, not shown, may be provided at the controlling station or in any other suitable place for connecting the battery 296 directly to the bus wires 263 and 264 for starting the motor generator set. This may be accomplished, for example, by means of the switches 298 and 106.

It is believed that the operation of the entire locomotive will be sufficiently clear that a full understanding may now be had of the same. Suffice it to say that the operation described in connection with Figures 1, 8, 9 and 10 applies directly to the extended system shown in Figure 7.

When the locomotive operates on three phase, alternating current supply the changeover relay 185 is energized and the contacts 188 are closed. The transformer then operates on straight three phase transformation driving the motor generator set 82 to convert the required proportion of energy into direct current.

The operation of the locomotive through the actuation of the controller then proceeds, as previously described, the four driving axles being operated in unison. The regeneration of the excess power of the alternating current motors through the direct current motors and the motor generator set proceeds as previously described in the second and fourth steps of acceleration. Regenerative braking occurs as previously described in connection with Figures 1 and 8.

When the deceleration has proceeded to a point where the air brakes are to be applied, shifting of the brake handle 301 to any of the brake applying positions cuts the synchronizing control circuit at the off-normal contact 260 with the result that the windings 96 for braking the A. C. motors are opened, the signal lights 124, 132 and 139 are extinguished and the high and low speed control switches 133, 141 and 142 are opened. The D. C. motors may run at any speed at which the controller is set, but it may be advisable to interlock the D. C. motor controls or the generator supplying power to the same with the brake lever. As here shown this is not done since the D. C. motor cannot run away under any circumstances even with their series fields cut in because of the heavy excitation of the shunt field.

When the locomotive enters a single phase zone the contact shoe 196 engaging the track contact 197, or other equivalent means, causes the changeover relay 189 to shift the contactor 186 to the contacts 187 for controlling the pantograph and the transformer connections to adapt the same for single phase operation. The operator of the locomotive can raise or lower the pantographs by remote control in the switch bank 227 and he can select the individual pantographs to be raised or lowered at the pantographs control switches 225A and 225B.

The diagram of Figure 9 is a curve showing the speed of the alternating current motor for various speeds of the load.

The curve of Figure 10 shows the action of the D. C. motor throughout the various stages of operation as the speed of the load is varied. The vertical lines marked X and Y on this curve represent idling. The diagonal lines marked A, B, C, D and E in Figure 10 show the action of the direct current motor in terms of speed of the direct current motor with respect to the speed of the load corresponding to the similarly designated portions of the power demand curve of Figure 8.

I do not intend to be limited to the details shown and described, and am aware that numerous modifications of elements within the combinations herein claimed may be made without departing from the spirit and scope of the invention. I consider that the variable speed drive operating on three phase or single phase alternating current of commercial frequency or any other frequency is broadly new and the control means which I have herein shown for effecting the same is also broadly new.

I claim:

1. In combination a driving axle, a D. C. motor and an A. C. motor differentially connected thereto, and a controller for controlling the application of alternating current to the A. C. motor and direct current to the D. C. motor either separately or simultaneously.

2. In combination a driven member, a D. C. motor and an A. C. motor connected thereto, a controller having two positions, means controlled by the first position for supplying power to the D. C. motor only, and means controlled by the second position for supplying power to the A. C. motor and permitting power to flow from the D. C. motor.

3. In combination a driven member, a D. C. motor and an A. C. motor connected thereto, a controller having a plurality of positions, means controlled by one position of the controller for supplying power to the D. C. motor only, means controlled by the second position for supplying power to the A. C. motor, means controlled by the second position for permitting power to flow from the D. C. motor, and means controlled by another position of the controller for supplying power to both motors simultaneously.

4. In combination a driving member, a driven member, a D. C. motor and an A. C. motor connected thereto, a controller having a plurality of positions, means controlled by one position for supplying power to the D. C. motor only, means controlled by a second position for permitting power to flow from said D. C. motor, and means controlled by another position of the controller for supplying power to both of said motors simultaneously.

5. In a device of the class described the combination of a load device, an A. C. motor, a D. C. motor, said motors being differentially connected with the load device, and a controller for causing the D. C. motor to accelerate the load while the A. C. motor resists the torque of te D. C. motor and remains at substantially zero speed.

6. In a device of the class described the combination of a load device, an A. C. motor, a D. C. motor, said motors being differentially connected with the load device, a controller for causing the D. C. motor to accelerate the load while the A. C. motor resists the torque of the D. C. motor and remains at substantially zero speed and means governed by the controller for causing the D. C. motor to accelerate the A. C. motor to a predetermined speed.

7. In a device of the class described the combination of a load device, an A. C. motor, a D. C. motor, said motors being differentially connected with the load device, a controller for causing the D. C. motor to accelerate the load while the A. C. motor resists the torque of the D. C. motor and remains at substantially zero speed, means governed by the controller for causing the D. C. motor to accelerate the A. C. motor to a predetermined speed, a source of alternating current and a switch governed by the controller for causing the alternating current motor to be connected to said source of alternating current.

8. In a device of the class described the combination of a load device, an A. C. motor, a D. C. motor, said motors being differentially connected with the load device, a controller for causing the D. C. motor to accelerate the load while the A. C. motor resists the torque of the D. C. motor and remains at substantially zero speed, means governed by the controller for causing the D. C. motor to accelerate the A. C. motor to a predetermined speed, a source of alternating current, a switch governed by the controller for causing the alternating current motor to be connected to said source of alternating current, and a synchronizing relay for preventing the closing of said switch until the A. C. motor is moving at substantially synchronous speed.

9. In combination, a source of alternating current, a fixed speed type alternating current motor, a variable speed motor for accelerating the fixed speed type motor, a controller for governing said motors, a switch governed by the controller for connecting the fixed speed type motor to said source and a relay for preventing closing of said switch until said fixed speed type motor is moving at substantially synchronous speed.

10. In combination, a source of alternating current, a fixed speed type alternating current motor, a variable speed direct current motor for accelerating the fixed speed type motor, a converter between said source of alternating current and said variable speed motor, a controller for governing the transfer of power between the source and said variable speed motor through said converter, a switch governed by the controller for connecting the fixed speed type motor to said source and a synchronizing relay for preventing the closing of said switch until said fixed speed type motor is moving at substantially synchronous speed.

11. In combination, an A. C. current collector, air brake control means, a driving axle, an A. C. motor and a D. C. motor differentially connected to the driving axle, a reversible converter between the A. C. current collector and the D. C. motor, a controller, means governed by the controller for governing the transfer of power between said A. C. current collector and the D. C. motor, and means governed by the controller for holding the A. C. motor at substantially zero speed said means being interlocked with said air brake control means for preventing the operation of said holding means when the air brake control means is out of a predetermined position.

12. In combination, an A. C. current collector, air brake control means, a driving axle, an A. C. motor and a D. C. motor differentially connected to the driving axle, a reversible converter between the A. C. current collector and the D. C. motor, a controller, means governed by the controller for governing the transfer of power between said A. C. current collector and the D. C. motor, and means governed by the controller for holding the A. C. motor at substantially zero speed said means being interlocked with said air brake control means for preventing the operation of said holding means when the air brake control means is out of a predetermined position, means governed by the controller for causing the D. C. motor to accelerate the load while the A. C. motor is governed by said holding means, said D. C. motor being governed by said controller to accelerate the A. C. motor after said holding means is released, a synchronizing control device and a switch governed jointly by said controller and said synchronizing control device for connecting the A. C. motor to said A. C. current collector.

13. In combination, an A. C. current collector, air brake control means, a driving axle, an A. C. motor and a D. C. motor differentially connected to the driving axle, a reversible converter between the A. C. current collector and the D. C. motor, a controller, means governed by the controller for governing the transfer of power between said A. C. current collector and the D. C. motor, means governed by the controller for holding the A. C. motor at substantially zero speed said means being interlocked with said air brake control means for preventing the operation of said holding means when the air brake control means is out of a predetermined position, means governed by the controller for causing the D. C. motor to accelerate the load while said holding means is active, said D. C. motor being governed by said controller to accelerate the A. C. motor when said holding means is inactive, a switch for connecting the A. C. motor to said A. C. current collector, a synchronizing control device, said switch being controlled jointly by said controller, said synchronizing control device and said air brake control means.

14. In combination, a source of alternating current, a load, a variable speed direct current motor, a reversible converter between the source of alternating current and the D. C. motor, an alternating current motor having a low speed and a high speed connection and a brake, both of said motors being connected to the load, a controller governing said converter to vary the transfer of power between said source of A. C. and said D. C. motor, and vice versa, said controller having means for applying the brake and causing the D. C. motor to accelerate the load, means for closing the low speed connection of the A. C. motor to drive the load and to drive the D. C. motor as a generator, said D. C. motor thereafter being governed to act as a motor, and means controlled by said controller for closing the high speed connection of said A. C. motor to cause it to drive the load and to drive said D. C. motor as a generator.

15. In combination, a source of alternating current, a load, a variable speed D. C. motor, a reversible converter between said source of A. C. and said D. C. motor, a main A. C. motor, both of said motors being connected to the load, and a controller for governing both of said motors, said controller having means for causing the D. C. motor to start the load and for thereafter accelerating the A. C. motor to substantially synchronous speed and means controlled by the controller for then connecting the A. C. motor to the source of alternating current.

16. In combination, a source of alternating current, a load, a variable speed D. C. motor, a reversible converter between said source of A. C. and said D. C. motor, a main A. C. motor, both of said motors being connected to the load, and a controller for governing both of said motors, said controller having means for causing the D. C. motor to start the load and for thereafter accelerating the A. C. motor to substantially synchronous speed and means controlled by the controller for then connecting the A. C. motor to the source of alternating current and a synchronizing control device for governing said last named means.

17. In combination, a source of alternating current, a load, a variable speed direct current motor, a fixed speed type alternating current motor, said motors being differentially connected to the load, a speed indicating generator connected to said alternating current motor, a motor generator set having a motor connected to said source of alternating current and having a speed indicating generator, a controller for governing said motors, means controlled by the controller for causing the variable speed motor to accelerate the fixed speed type motor, and a relay subject to both of said speed indicating generators for controlling the operation of the alternating current motor.

18. In combination, a source of alternating current, a load, a variable speed motor, a fixed speed type motor, said motors being differentially connected to said load, a brake for the fixed speed type motor, a controller for both of said motors, said controller having means for varying the speed of the variable speed motor to cause it to accelerate the load, a main switch for the fixed speed type motor, a synchronizing control relay, said brake and said switch being under the joint control of said controller and said synchronizing control relay.

19. In combination, a D. C. motor, an A. C. motor, a load device differentially connected to both motors, a controller for governing the operation of both of said motors, said controller having a D. C. control unit for accelerating the D. C. motor to maximum and decelerating it to minimum speed in one cycle of operation and an A. C. control unit for stepping the speed of the A. C. motor from one fixed speed to another fixed speed.

20. In combination, a D. C. motor, an A. C. motor, a load device differentially connected to both motors, a controller for governing the operation of both of said motors, said controller having a D. C. control unit for accelerating the D. C. motor to maximum and decelerating it to minimum speed in one cycle of operation and an A. C. control unit for stepping the speed of the A. C. motor from one fixed speed to another fixed speed, said units being connected for operation in a predetermined relation and the D. C. unit causing the D. C. motor to pass through one cycle while the A. C. unit causes the A. C. motor to go from one fixed speed to another fixed speed.

21. In combination, a D. C. motor, an A. C. motor, a load device differentially connected to said motors, a source of A. C., a reversible converter between the source of A. C. and the D. C. motor, switching means for switching the A. C. motor with respect to the source of A. C., means for controlling the converter to govern the transfer of power between said source of A. C. and the D. C. motor, and a controller for governing both of said means.

22. In combination, a source of A. C., a load device, an A. C. motor and a D. C. motor connected differentially to the load device, a reversible converter between the source of A. C. and D. C. motor, a control circuit governing the converter, a control switch between the source of A. C. and the A. C. motor, and a controller having means for governing said control circuit and said control switch.

23. In combination, a source of A. C., a load device, an A. C. motor and a D. C. motor connected differentially to the load device, a motor generator set between the source of A. C. and the D. C. motor, a field circuit for the generator for controlling the transfer of energy between the source of A. C. and the D. C. motor a switch for controlling the connection between the A. C. motor and the source of A. C., and a controller having a rheostat for controlling said field circuit and having means for controlling said switch.

24. In a device of the class described the combination of a source of three phase A. C. current collecting means, a driving axle, a traction D. C. motor having a shunt field and a series field, a traction A. C. motor, said motors being differentially connected to said axle, an A. C. motor—D. C. generator set both said A. C. traction motor and said second A. C. motor being operable on single phase, a transformer between the source of A. C. and the A. C. motors, means for shifting the connections of the transformer to supply single phase A. C. to all of the windings of said A. C. motors, said A. C. traction motor having a double speed winding, switches controlling the connections of said winding, a brake for said A. C. motor, a series circuit including the armatures of the D. C. motor and the D. C. generator, a field control circuit for said D. C. generator, a controller having a rheostat for governing the field control circuit and having a series of control contacts including a brake control contact for the A. C. motor, a contact for controlling the connection of the series field of the D. C. motor, a contact for controlling the low speed connection of the A. C. traction motor and a contact for controlling the high speed connection of said A. C. traction motor, said contacts being successively brought into action while said rheostat is varied to control the speed and direction of the D. C. traction motor.

25. In combination, a source of A. C., a driving axle, a D. C. traction motor, said D. C. motor having a separately excited and a series field, a motor generator set driven by said A. C. source for supplying current to said D. C. motor and having a direct coupled separate exciter for constant excitation of the said separately excited field, a rheostat for controlling the flow of current from said generator set to the series field of said D. C. motor and means for cutting out the series field when the rheostat has reached a predetermined position.

26. In combination, a source of A. C., a current collector and a driving axle, an A. C. traction motor, a D. C. traction motor, said motors being differentially connected to said axle, an A. C. motor—D. C. generator set, a D. C. exciter for exciting the shunt field of the D. C. motor, a series circuit connecting the armatures of the D. C. generator and the D. C. motor, a rheostat for controlling the field circuit of the generator, means for holding the speed of the A. C. motor at substantially zero against the torque of the D. C. motor during the acceleration of the D. C. motor to substantially its maximum speed.

27. In a drive, a source of A. C., a motor generator set receiving current from said A. C. source comprising an A. C. motor, and a D. C. generator, a variable potential exciter and a constant potential exciter, a D. C. motor having its armature connected to said generator armature, said constant potential exciter being self exciting, a field circuit for said variable potential exciter supplied by said constant potential exciter, a rheostat for controlling the potential and polarity of said field circuit, and a field circuit for said generator supplied with current from said variable potential exciter, said D. C. motor having a series field adapted to be cut out by movement of said rheostat.

28. In combination, a source of A. C., a plurality of motor generator sets receiving current from said A. C. source each comprising an A. C. motor, a D. C. generator, a variable potential exciter and a constant potential exciter, a plurality of corresponding D. C. motors having their fields excited by their own constant potential exciters and having their armatures in series with their corresponding generator armatures, a single rheostat for controlling the potential and polarity applied to the fields of all of said generators, and a series field for each of said D. C. motors adapted to be cut out by movement of said rheostat, said last named field being in series with the generator connections to said D. C. motors.

29. In a multiple unit traction system, a series of units each comprising a D. C. traction motor, and a motor generator set, each motor generator set comprising an A. C. motor, a D. C. generator having its armature connected to the D. C. traction motor armature and having a separately excited field, a variable potential and polarity exciter, the said generators of all the units having a common field control circuit, a controller for controlling said circuit, a constant potential exciter for each motor generator set each constant potential exciter exciting the field of its corresponding traction motor and separate series field circuits for each of said D. C. traction motors, said controller controlling said circuits to cut out said fields simultaneously.

30. In a multiple unit traction system, a series of units each comprising a D. C. traction motor and a motor generator set, each motor generator set comprising an A. C. motor, a D. C. generator having its armature connected to the D. C. traction motor armature and having a separately excited field, a variable potential and polarity exciter, the said generators of all the units having a common field control circuit, a controller for controlling said circuit, a constant potential exciter for each motor generator set, each constant potential exciter exciting the field of its corresponding traction motor, each traction motor having a series field and a control circuit governed by said controller for cutting out the series field of each traction motor.

31. In a multiple unit traction system, a source of A. C., a series of units, each comprising a driving axle, a D. C. traction motor and an A. C. traction motor, said motors and said axle being differentially connected, each unit having a motor generator set comprising an A. C. motor, a D. C. generator, a variable potential exciter and a constant potential exciter, the constant potential exciter supplying field excitation for the D. C. traction motor, a controller in one of the units having means for controlling the potential and polarity of the field excitation of all of said generators in common, the variable potential exciter of the unit under control providing the field excitation for all the generators, the generator of each unit providing the armature current for its corresponding D. C. traction motor, the A. C. motors each having a switch to control connection thereof to the source of A. C. and having holding means for holding the motor against the torque of the D. C. motor at substantially zero speed, said controller having means to govern in common the switches of the A. C. motors of said units, and having means to govern in common the holding means of the A. C. motors of said units.

32. In combination an A. C. motor, a D. C. motor, a load differentially connected to said motors, a controller comprising a D. C. motor control unit and an A. C. motor control unit, said units comprising connected members having a common manual controlling means, the A. C. motor control unit having means to cause the A. C. motor to assume a plurality of substantially fixed speeds, the D. C. motor control unit causing the D. C. motor to be accelerated from zero to maximum in one direction and decelerated from maximum to zero and accelerated to maximum in the opposite direction, before the A. C. motor control unit causes the A. C. motor to be changed from one speed to another.

33. In a device of the class described, the combination of a load device, an A. C. motor, a D. C. motor, said motors being differentially connected with the load device, a controller for causing the D. C. motor to accelerate the load device while the A. C. motor resists the torque of the D. C. motor and remains at substantially zero speed, means controlled by the controller for causing the D. C. motor to accelerate the A. C. motor to substantially a predetermined speed, a source of alternating current, a switch for connecting said source of alternating current to the A. C. motor and a synchronizing control element governing said switch.

34. In combination a source of A. C., a load, a D. C. motor and an A. C. motor differentially connected to said load, a reversible converter connected between said source and said D. C. motor, switching mechanism between the source and said A. C. motor, a controller having means governing the converter to control the D. C. motor and having means governing the switching mechanism to control the A. C. motor.

35. In combination a source of A. C., a load, a D. C. motor and an A. C. motor differentially connected to said load, a reversible converter connected between said source and said D. C. motor, switching mechanism between the source and said A. C. motor, a controller having means governing the converter to control the D. C. motor and having means governing the switching mechanism to control the A. C. motor, and a synchronizing control device governing said latter means.

36. In a multi-unit drive system, a plurality of units each unit comprising a driving axle, a D. C. motor and an A. C. motor all differentially connected together, a control cable between the units and controllers in each unit, each controller being capable of governing all the units through said connected control cables.

37. In a multi-unit drive system, a plurality of units each unit comprising a driving axle, a D. C. motor and an A. C. motor all differentially connected together, a control cable between the units and controllers in each unit, each controller being capable of governing all the units through said connected control cables, and switching means for enabling any one controller to govern the drive of all of said units.

38. In combination, an axle, a source of A. C., an A. C. traction motor and a D. C. traction motor geared together to the axle, a reversible converter connected to said A. C. source for converting A. C. to D. C., a switch for connecting the A. C. motor to the source, a rheostat for governing the D. C. motor and a synchronizing device governing the switch.

39. In a multi-unit drive, a plurality of driving units, a source of three phase A. C., a trolley system adapted to connect to said source for three phase A. C., a current collector coöperating with the trolley system for each unit, a three phase squirrel cage A. C. traction motor for each unit, transformers between the current collectors and the motors a positional control device, means for converting said trolley system to single phase operation and means in each unit governed by the control device for switching the transformer connections to drive the corresponding motor on single phase current, and a common controller for all of the motors.

40. In a multi-unit drive, a plurality of driving units, a source of three phase A. C., a trolley system connected to said source for three phase A. C., a current collector for each unit cooperating with the trolley system, means for converting said trolley system to single phase operation a three phase traction motor for each unit, means in each unit for causing the collector to receive single phase current from the trolley system, a positional control device, means in each unit governed by the control device for operating said means, and a common controller for all of said motors.

41. In combination, a plurality of drive units, each unit comprising a driven member with an A. C. motor and a D. C. motor differentially connected thereto, means for supplying A. C. to the A. C. motors, a converter for converting A. C. from said supply means to D. C. for said D. C. motors of the units, said converter including a D. C. generator having a field winding and a controller for governing said units, said controller having a rheostat for governing the field winding of the D. C. generator to control the D. C. motors in unison.

42. In combination, a plurality of drive units, each unit comprising a driven member with an A. C. motor and a D. C. motor differentially connected thereto, the A. C. motors having connections for causing them to operate at a plurality of substantially fixed speeds, means for supplying A. C. to the A. C. motors, a converter for converting A. C. from said supply means to D. C. for said D. C. motors of the units, said converter including a D. C. generator having a field winding, and a controller for governing said units, said controller having means for switching the speed changing connections of the A. C. motors and having a rheostat for governing the field winding of the D. C. generator to control the D. C. motors in unison.

ALLEN M. ROSSMAN.

CERTIFICATE OF CORRECTION.

Patent No. 1,947,494.      February 20, 1934.

ALLEN M. ROSSMAN.

It is hereby certified that the name of the assignee in the above numbered patent was erroneously described and specified as "Rossman, Sargent & Lundy Patents Corporation" whereas said name should have been described and specified as Rossman Engineering Company, of Chicago, Illinois, a corporation of Illinois, as shown by the records of assignments in this office; and that the said Letters Patent should be read with this correction therein that the same may conform to the record of the case in the Patent Office.

Signed and sealed this 20th day of March, A. D. 1934.

F. M. Hopkins (Seal)      Acting Commissioner of Patents.